United States Patent Office 3,496,163
Patented Feb. 17, 1970

3,496,163
7-HALO-7-DEOXYLINCOMYCINS AND PROCESS FOR PREPARING THE SAME
Robert D. Birkenmeyer, Comstock Township, Kalamazoo County, and Fred Kagan, Kalamazoo, Mich., assignors to The Upjohn Company, Kalamazoo, Mich., a corporation of Delaware
No Drawing. Continuation-in-part of applications Ser. No. 431,184, Feb. 8, 1965, Ser. No. 498,989, Oct. 20, 1965, Ser. No. 511,288, Dec. 1, 1965, and Ser. No. 587,662, Oct. 19, 1966. This application Jan. 9, 1968, Ser. No. 696,518
Int. Cl. C07c 47/18, 69/20, 95/04
U.S. Cl. 260—210
51 Claims

ABSTRACT OF THE DISCLOSURE

Novel compounds of the formula:

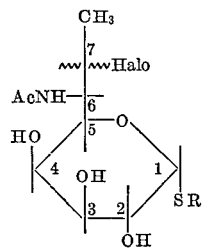

(I)

are prepared by replacing by halogen, the 7-hydroxyl of a compound of the formula

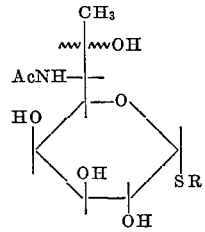

(II)

The replacement is effected advantageously by mixing the starting compound of Formula II with Rydon reagent and heating. The replacement when Halo is chlorine can also be effected by mixing the starting compound of Formula II with thionyl chloride and heating. Compounds of Formula I wherein Ac is acyl can also be prepared by acylating a compound of Formula I wherein Ac is hydrogen. The replacement when Halo is iodine is effected by a modified Rydon reagent process. Any or all of the 2-, 3-, and 4-hydroxy groups can be esterified or etherified before or after the halogenation.

CROSS REFERENCES TO RELATED APPLICATIONS

This application is a continuation-in-part of our application Ser. No. 431,184, filed Feb. 8, 1965, now abandoned, and our copending applications Ser. No. 498,989, filed Oct. 20, 1965, now abandoned; Ser. No. 511,288, filed Dec. 1, 1965, now abandoned; and Ser. No. 587,662, filed Oct. 19, 1966, now abandoned.

BRIEF SUMMARY OF INVENTION

This invention relates to novel compounds and to processes for preparing them, and is particularly directed to 7-halo-7-deoxylincomycins, i.e., 7(S)-halo-7-deoxylincomycin and 7(R)-halo-7-deoxylincomycin and analogs thereof, as well as esters and ethers thereof, and to processes whereby they and like compounds are produced.

The novel compounds of the invention can be represented by the following structural formula:

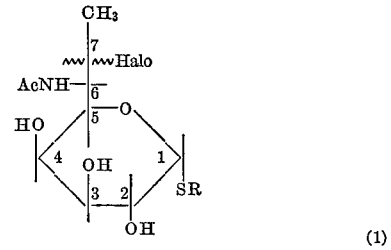

(1)

wherein Halo is chlorine, bromine, or iodine; R is alkyl of not more than 20 carbon atoms, advantageously not more than 8 carbon atoms, cycloalkyl of from 3 to not more than 8 carbon atoms, and aralkyl of not more than 12 carbon atoms, advantageously not more than 8 carbon atoms; and Ac is the acyl radical of a 4-substituted-L-2-pyrrolidinecarboxylic acid of the formulas

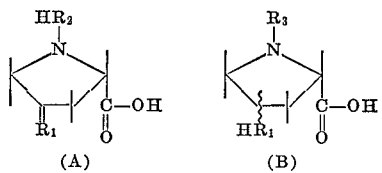

wherein $R_1$ and $R_2$ are alkylidene of not more than 20 carbon atoms (including methylene), advantageously not more than 8 carbon atoms, cycloalkylidene of from 3 to not more than 8 carbon atoms, and aralkylidene of not more than 12 carbon atoms, advantageously not more than 8 carbon atoms; and $R_3$ is hydrogen or $HR_2$. Ac can also be the acyl group of L-2-pyrrolidinecarboxylic acid. Any or all of the 2-, 3-, and 4-hydroxyl groups can be esterified or etherified.

Examples of alkyl of not more than 20 carbon atoms (R, $HR_1$, and $HR_2$) are methyl, ethyl, propyl, butyl, pentyl, hexyl, heptyl, octyl nonyl, decyl, undecyl, dodecyl, tridecyl, tetradecyl, pentadecyl, hexadecyl, heptadecyl, octadecyl, nonadecyl, and eicosyl and the isomeric forms thereof. Examples of cycloalkyl are cyclopropyl, cyclobutyl, cyclopentyl, cyclohexyl, cycloheptyl, cyclooctyl, 2-methylcyclopentyl, 2,3-dimethylcyclobutyl, 4-methylcyclobutyl, and 3-cyclopentylpropyl. Examples of aralkyl are benzyl, phenethyl, α-phenylpropyl, and α-naphthylmethyl. Examples of alkylidene, cycloalkylidene, and aralkylidene groups ($R_1$ and $R_2$) include methylene, ethylidene, propylidene, butylidene, pentylidene, hexylidene, heptylidene, octylidene, nonylidene, decylidene, undecylidene, dodecylidene, tridecylidene, tetradecylidene, pentadecylidene, hexadecylidene, heptadecylidene, octadecylidene, nonadecylidene, eicosylidene, and the isomeric forms thereof, cyclopropylidene, cyclobutylidene, cyclopentylidene, cyclohexylidene, cycloheptylidene, cyclooctylidene, 2-cyclopropylethylidene, 3-cyclopentylpropylidene, benzylidene, 2-phenylethylidene, 3-phenylpropylidene, and α-naphthylmethylene.

The novel compounds of the invention, Formula I, as well as other related compounds, can be prepared by replacing by halogen, e.g., chlorine, bromine, or iodine, the 7-hydroxyl of a compound of the formula

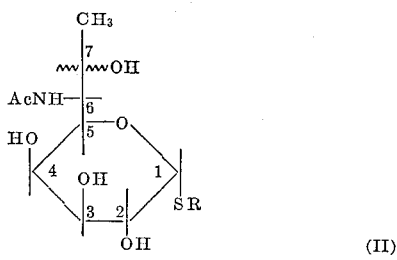
(II)

The replacement is effected advantageously by mixing the starting compound of Formula II with Rydon reagent and heating. Where Halo is chlorine the replacement can also be effected by heating with thionyl chloride. The thionyl chloride process, however, is being claimed in another application. When Halo is iodine the replacement is effected by a modified Rydon reagent process, which process is being claimed in another application.

In the Rydon reagent process, which is being claimed in this application, Ac can be hydrogen or any acyl radical and R can be the radical of any mercaptan. Preferably, Ac and R are radicals which are non-reactive with Rydon reagent.

Ac can also be a radical of a 4-substituted-L-2-pyrrolidinecarboxylic acid of the formula

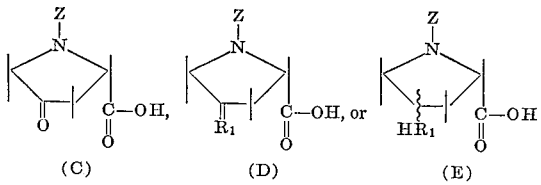

or the acyl group of an L-2-pyrrolidinecarboxylic acid of the formula

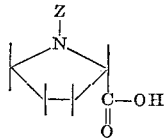

wherein Z is a protective group removable by hydrogenolysis or solvolysis wherein Z is "carbobenzoxy."

Compounds of Formula I where Ac acyl can also be prepared by acylating a compound of Formula I where Ac is hydrogen, The $HR_1$- group can be in either the cis or trans position as illustrated in the following formulas

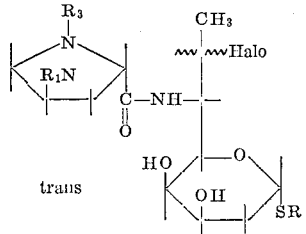
III and

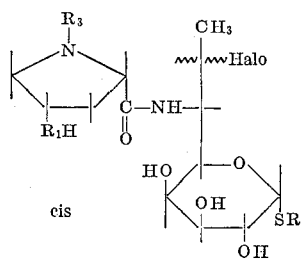
IV

If desired, the cis and trans isomers can be separated by counter current distribution or chromatography, either before or after replacement of the 7-hydroxy group.

When $R_3$ in Formulas B, IB, and IIB is hydrogen (Formulas IB and IIB are, respectively, Formulas I and II wherein Ac is the acyl of acid B), it can be replaced by suitable alkylation or like procedure. Advantageously, this replacement is effected by reacting the compound according to Formula B, IB, or IIB, wherein $R_3$ is hydrogen with an oxo compound (an aldehyde or a ketone) and hydrogenating the resulting adduct with a catalyst effective to saturate an olefinic double bond. Either platinum or palladium can be used as the catalyst. Suitable oxo compounds have the formula $R_4R_5CO$ where $R_4R_5C=$ is the same as $R_2$ given above. Examples of suitable oxo compounds are formaldehyde, acetaldehyde, propionaldehyde, butyraldehyde, acetone, isobutylmethyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3 - cyclopentanepropionaldehyde, cyclohexaneacetaldehyde, cycloheptanecarboxaldehyde, 2,2 - dimethylcyclopropylacetaldehyde, 2,2-dimethylcyclopropyl methyl ketone, cyclopentyl methyl ketone, cyclobutyl methyl ketone, cyclobutanone, cyclohexanone, 4-methylcyclohexanone, and the like.

DETAILED DESCRIPTION

The starting compounds of Formula II are prepared by acylating a compound of the formula

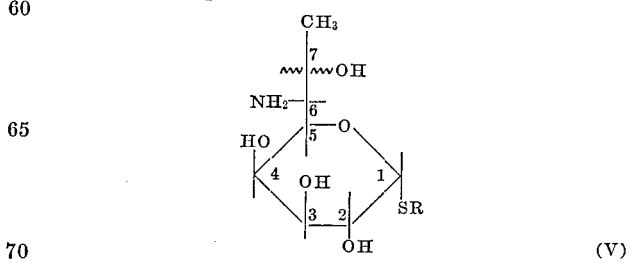
(V)

wherein R is as given above with a 4-substituted-L-2-pyrrolidinecarboxylic acid of Formula A or B. This acylation and like acylations referred to herein, for example, acylation with acids C, D, and E, or acylation of compounds of Formula I where Ac is hydrogen with acids of formulas A, B, C, D, or E, can be effected by procedures already well known in the art for acylating amino sugars.

The starting acid of Formula A can be prepared by reacting a 4-oxo compound of the formula

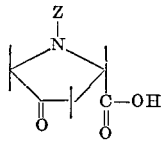

(C)

wherein Z is a protective group which is removable by hydrogenolysis or solvolysis with a Wittig agent, e.g. an alkylidene-triphenylphosphorane [see e.g., Wittig et al., Ber., 87, 1348 (1954); Trippett, Quarterly Reviews, XVII, No. 4, p. 406 (1963)]. Suitable such groups are trityl, i.e., triphenylmethyl, diphenyl (p-methoxyphenyl) methyl, bis-(p-methoxyphenyl)phenylmethyl, benzyl, or p-nitrobenzyl and hydrocarbyloxycarbonyl groups. Examples of the latter are tertiary-butoxycarbonyl; benzyloxycarbonyl groups of the formula

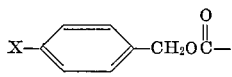

wherein X is hydrogen, nitro, methoxy, chloro, or bromo, for example, carbobenzoxy, p - nitrocarbobenzoxy, p-bromo-, and p-chlorocarbobenzoxy; and phenyloxycarbonyl groups of the formula

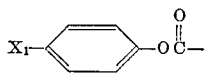

wherein $X_1$ is hydrogen, allyl, or alkyl of not more than 4 carbon atoms, such as phenyloxycarbonyl, p-tolyloxycarbonyl, p-ethylphenyloxycarbonyl, and p-allylphenyloxycarbonyl and the like.

In carrying out this process the 4-oxo-L-2-pyrrolidinecarboxylic acid (Formula C) is added to a freshly prepared Wittig reagent. The Wittig reagents herein used can be generally represented by the following formula:

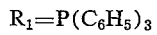

wherein $R_1$ is as given above. These Wittig reagents are prepared by reacting an alkyl, cycloalkyl, or aralkyltriphenylphosphonium halide with a base such as sodamide, or sodium or potassium hydride, or the sodium or potassium metalate of demethylsulfoxide and the like. For example, the elimination of hydrogen halide from alkyltriphenylphosphonium halide, produces alkylidenetriphenylphosphorane. [The preparation of phosphoranes is discussed in detail by Trippett, Quart. Rev. XVII, No. 4, p. 406 (1963).] The reaction is generally carried out in an organic solvent, such as benzene, toluene, ether, dimethylsulfoxide, tetrahydrofuran, or the like, at temperatures between 10° C. and the reflux temperature of the reaction mixture. The thus-obtained product, a 4-alkylidene-, 4-cycloalkylidene-, or 4-aralkylidene-1- protected -L-proline which has the following formula

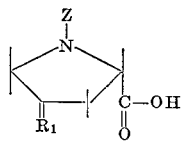

(D)

is recovered from the reaction mixture in a conventional manner, generally by extraction from aqueous solutions of the reaction mixture. The crude product can be purified by conventional means, such as recrystallization, chromatography, or formation and recrystallization of easily formed derivatives such as amine salts of the amino acid, e.g., the dicyclohexylamine salt, and the like, and liberating the amino acids from such compounds. By hydrogenating an acid of Formula D in the presence of a catalyst, e.g., platinum, which is effective to saturate a double bond, but which is ineffective to effect hydrogenolysis, a compound of the following formula

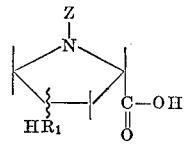

(E)

is obtained. Platinum deposited on a carrier, e.g., carbon or an anion exchange resin like Dowex-1, a cross-linked polystyrene trimethyl benzylammonium resin in the hydroxide cycle is suitable. If desired, the starting compounds of Formula V can be acylated with acids of Formula C, D, or E to form compounds IIC, IID, and IIE, respectively. Compound IIC can be converted to compound IID by treatment with a Wittig reagent and compound IID hydrogenated to compound IIE by the procedures given above. The hydrogenation, both of the acid D and the acylate IID, gives a mixture of cis and trans isomers which, if desired, can be separated by counter current distribution or chromatography. The starting acids of Formula B in which $R_3$ is hydrogen are obtained when an acid of Formula D or E is subjected to hydrogenolysis over a palladium catalyst, e.g., palladium on carbon. Likewise, compounds of Formulas IID and IIE are converted to compounds of Formula IIB in which $R_3$ is hydrogen by the same process. The starting acids of Formula B in which $R_3$ is hydrogen as well as compounds of Formula IIB in which $R_3$ is hydrogen can be converted respectively to compounds of Formulas B and IIB in which $R_3$ is $HR_2$ by the procedures given above. The starting acids of Formula A and Formula B are obtained by treating an acid of Formula D or Formula E with hydrogen bromide in acetic acid to remove the Z group and then replacing the N-hydrogen with an $HR_2$ group by the procedure given above. Compounds of Formulas IID and IIE are converted to compounds of Formula IIB by the same process.

Some of the starting compounds of Formula II are obtained biosynthetically. Lincomycin, methyl 6,8-dideoxy-6-(trans-1-methyl - 4 - propyl - L - 2 - pyrrolidinecarboxamido) - 1 - thio - D - erythro - α - D-galacto-octopyranoside, is obtained as an elaboration product of a lincomycin-producing actinomycete according to U.S. Patent 3,086,912. It has the following structural formula:

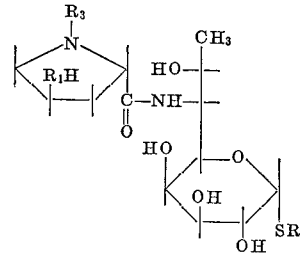

(VI)

wherein R and $R_3$ are methyl and $R_1H$ is propyl. Lincomycin, B, methyl 6,8-dideoxy-6-(trans-1-methyl-4-ethyl-L-2-pyrrolidinecarboxamido)-1-thio-D-ethyro - α - D-galacto-octopyranoside (Formula VI wherein R and $R_3$ are methyl and —$R_1H$ is ethyl) also is an elaboration product of the same microorganism when cultured according to the procedure given in U.S. Patent 3,086,912. Lincomycin C (S-ethyl-S-demethylincomycin), ethyl 6,8-dideoxy-6-(trans-1-methyl - 4 - propyl-L-2-pyrrolidinecarboxamido)- 1 - thio-D-erythro-α-D-galacto-octopyranoside (Formula VI wherein R is ethyl, —$R_1H$ is propyl, and $R_3$ is methyl) is obtained when the process of U.S. Patent 3,086,912 is carried out in the presence of added ethionine. Lincomycin D, methyl 6,8-dideoxy-6-(trans-4-propyl-L-2-pyrrolidinecarboxamido)-1-thio-D-erythro-α-D-galacto - octopyranoside (Formula VI wherein R is methyl, —$R_1H$ is propyl, and $R_3$ is hydrogen) is obtained when the fermentation of U.S. Patent 3,086,912 is carried out in the presence of added α-MTL (methyl α-thiolineosaminide), methyl 6-amino - 6,8 - dideoxy-D-erythro-1-thio-α-D-galacto-octopyranoside, a compound obtained by the hydrazinolysis of lincomycin according to U.S. Patent 3,179,595. N-demethyllincomycin B, methyl 6,8-dideoxy-6-(trans-4-ethyl-L-2-pyrrolidinecarboxamido) - 1 - thio - D - erythro-α-D-galacto-octopyranoside (Formula VI wherein R is methyl, —$R_1$H is ethyl and $R_3$ is hydrogen) is also produced when α-MTL is added to the fermentation of U.S. Patent 3,086,912. Similarly, lincomycin K, ethyl 6,8-dideoxy-6-(trans-4-propyl-L-2-pyrrolidinecarboxamido) - 1 - thio-D-ethrythro-α-D-galacto-octopyranoside (Formula VI wherein R is ethyl, —$R_1$H is propyl, and $R_3$ is hydrogen) is produced when the fermentation of U.S. Patent 3,086,-912 is carried out in the presence of added α-ETL (ethyl α - methylthiolincosaminide), ethyl 6-amino-6,8-dideoxy-D-erythro - α - thio-D-galacto-octopyranoside, a compound obtained by the hydrazinolysis of lincomycin C. S-ethyl-S,N-didemethyllincomycin B, ethyl 6,8-dideoxy-6-(trans - 4 - ethyl-L-2-pyrrolidinecarboxamido)-1-thio-D-erythro-α-D-galacto-octopyranoside (Formula VI wherein R is ethyl, —$R_1$H is ethyl, and $R_3$ is hydrogen) is also obtained when α-ETL is added to the fermentation of U.S. Patent 3,086,912. The above-described N-desmethyl products which are obtained when α-MTL and α-ETL are added to the fermentation process of U.S. Patent 3,086,-912 are examples of starting compound IIB wherein $R_3$ is hydrogen which, by the procedure described above can have the N-hydrogens replaced when it is desired for $R_3$ to equal $HR_2$, e.g., when it is desired to produce methyl 6,8-dideoxy-6-(trans-1-ethyl-4-propyl-L-2-pyrrolidinecarboxamido)-1-thio-D-erythro-α-D-galacto - octopyranoside or ethyl 6,8-dideoxy-6-(trans-1-methyl-4-ethyl-L-2-pyrrolidinecarboxamido) - 1 - thio-D-ethythro-α-D-galacto-octopyranoside or ethyl 6,8-dideoxy-6-(trans-1-ethyl-4 - ethyl-L-2-pyrrolidinecarboxamido)-1-thio-D-etrythro-α-D-galacto-octopyranoside or methyl 6,8-dideoxy-6-trans - 1 - ethyl-4-ethyl-L-2-pyrrolidinecarboxamido)-1-thio-D-erythro-α-D-galacto-octopyranoside.

Lincomycin or any of the starting compounds of Formula II which has the D-etrythro configuration can be converted to the L-threo configuration by oxidizing the 7-hydroxy group to a 7-oxo group and then reducing the latter to a 7-hydroxy group. A suitable procedure for this purpose is illustrated in the following sequence:

chromic oxide gives 7-dehydro-3,4-O-isopropylidenelin-6-(trans - 1 - methyl-4-propyl - L - 2 - pyrrolidinecarboxamido)-1-thio - D - glycero-α-D-galacto-octanopyranos-7-uloside) which on treatment with sodium borohydride is converted to 7-epilincomycin (methyl 6,8-dideoxy-6-(trans - 1 - methyl-4-propyl - L - 2 - pyrrolidinecarboxamido)-1-thio-L-threo-α-D-galacto-octopyranoside). Any of the starting compounds of Formula II having a D-etythro configuration can be converted to the corresponding D-threo configuration by this procedure.

As the biosynthetic-produced lincomycins, as well as the amino sugars derived therefrom, are either methyl or ethyl thioglycosides, it is sometimes desirable to convert them to higher or lower glycosides. It is also sometimes desirable to convert any of the compounds of Formulas I, II, or V to higher or lower glycosides. This can effectively be accomplished by reacting the compound to be converted with a mercaptan of the Formula $R_6SH$ wherein $R_6$ is an alkyl group of not more than 20 carbon atoms, but one different from R. For example, compounds of Formula I and II on reaction with a mercaptan of Formula $R_6SH$ produce dithioacetals of the formula

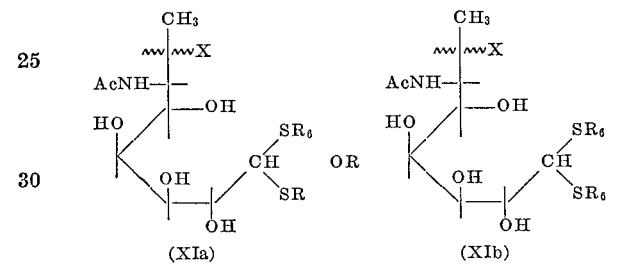

wherein X is hydroxy or halogen, which on treatment with acid and/or on heating is recyclized to give a compound of the following formula

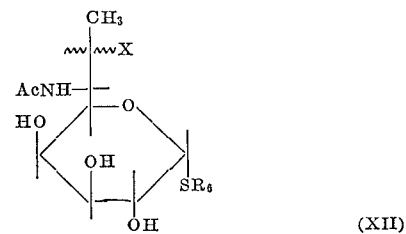

(XII)

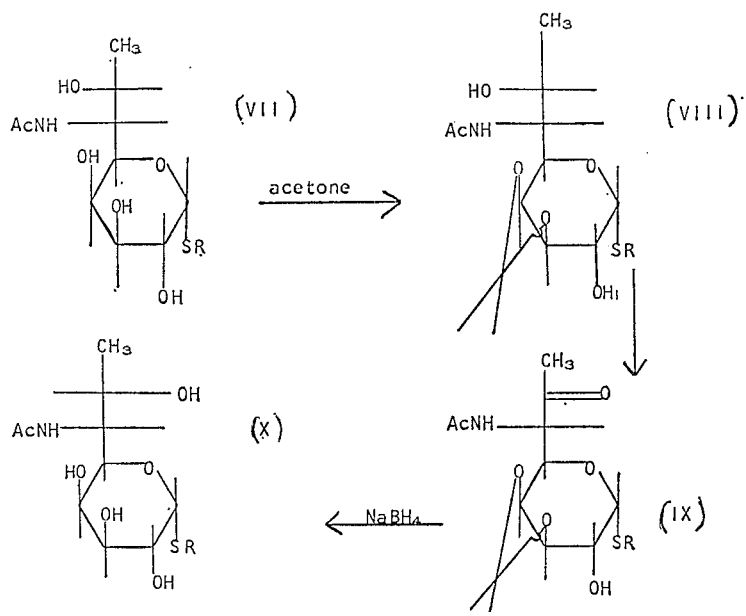

For example, lincomycin on treatment with acetone in the presence of p-toluenesulfonic acid is converted to 3,4-O-isopropylidenelincomycin which on oxidation with The process can be applied directly to any of the starting products of Formula II, i.e., IIA, IIB, IIC, IID, and IIE.

The resulting products can be subjected to hydrazinolysis to form compounds of the following formula:

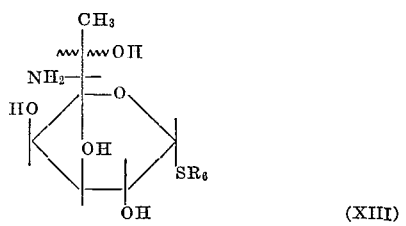

(XIII)

which can be N-acylated as described above with acids of Formula A, B, C, D, and E to provide compounds according to Formula XII wherein X is hydroxyl. The process can also be applied to the starting compounds of Formula V. For example, α-MTL on treatment with ethyl mercaptan followed by recyclization as described above is converted to α-ETL.

An alternative process for making compounds of Formula XII or Formula XIII is to brominate the starting material and then react it with the mercaptan according to the following sequence:

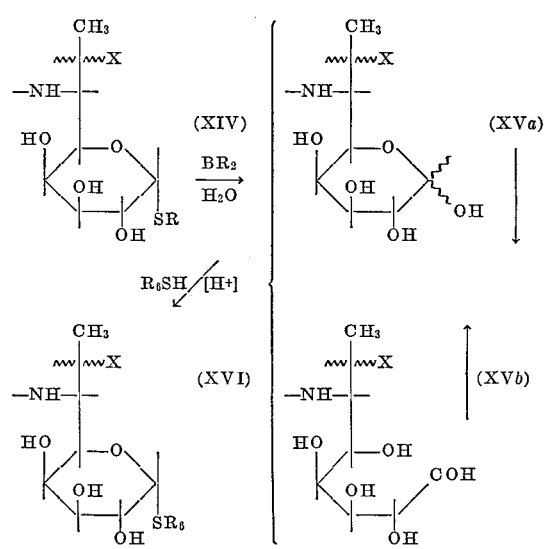

The starting compound, XIV, is dissolved in water as a soluble salt, e.g., the hydrochloride, and bromide added with cooling advantageously to between about −10 and 20° C. It is sufficient if the aqueous solution is cooled to about 0° C. and the bromine added dropwise. The stoichiometric amount of bromine is 1 mole for each mole of starting compound, though more or less can be used. Advantageously a slight excess, say from 5 to 20% excess, of bromine is used. The bromine initially replaces the RS— group and the resulting intermediate hydrolyzes to the sugar in which the pyranose form XVa is in equilibrium with the aldose form XVb in the presence of acid, e.g., hydrochloric acid or other strong non-oxidizing acid such as p-toluene sulfonic acid, and sulfonic acid type anion exchange resins, the mercaptan $R_6SH$ reacts with sugar XV to form the thioglycoside XVI. Concomitantly some diacetal of Formula XI may be formed which after separation can be cyclized as described above to form more of the desired thioglycoside XVI.

The mechanism by which Ryon reagent effects the substitution of the 7-hydroxyl by halogen is not fully understood. The mechanism is such that a change in configuration results. Thus, a 7(R)-hydroxy compound of the D-erythro configuration yields a 7(S)-halo compound of the L-threo configuration. In example 7(S)-chloro-7-deoxylincomycin which is derived from lincomycin (lincomycin has D-erythro configuration), has the L-threo configuration.

Rydon reagents are formed by the addition of halogen to triphenylphosphine or triphenylphosphite or addition of an alkyl halide to triphenylphosphite and can be represented by the formula:

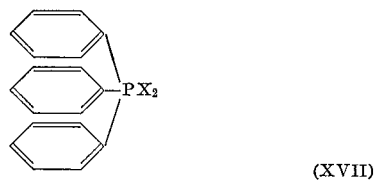

(XVII)

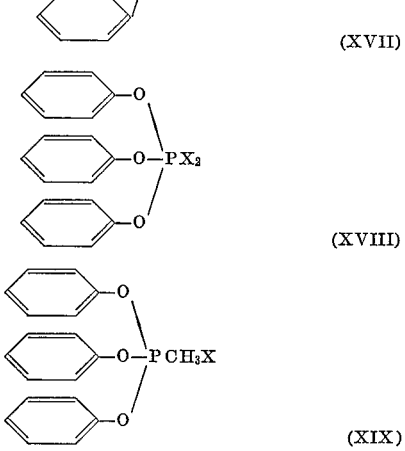

(XVIII)

(XIX)

wherein X is halogen, e.g., chlorine, bromine, and iodine. Rydon et al., J. Chem. Soc., 2224 (1953); Ibid, 2281 (1954); Ibid, 3043 (1956). The Rydon reagent can be formed in situ by addition of halogen or methyl halide to a solution of the triphenylphosphine or triphenylphosphite in an inert solvent such as acetonitrile or dimethylformamide, or it can be isolated as a separate entity. In either case the reaction with the lincomycin or related compound is effected by contacting the Rydon reagent therewith in an inert solvent, e.g., acetonitrile or dimethylformamide, until the desired substitution of the 7-hydroxy is obtained. The reaction takes place at ordinary temperature, though gentle heating can be effected if desired. Advantageously, the temperature is maintained between about 20° C. and about 55° C. The product can be recovered from the reaction mixture by well known techniques such as filtration, solvent extraction, etc. The reaction mixture advantageously is treated with methanol to destroy any excess Rydon reagent, filtered to remove any solid such as triphenylphosphine oxide, formed in the reaction, and then treated to recover the product. The methanol can be added either before or after the filtration. Advantageously, the treated and filtered reaction mixture is evaporated to dryness and purified by solvent extraction and/or chromatography.

To effect the substitution of the 7-hydroxy with chlorine by the thionyl chloride process, the starting compound of Formula II or V, advantageously in the form of an acid-addition salt, e.g., the hydrochloride, is mixed with thionyl chloride, advantageously in the presence of an inert solvent, with mild heating, advantageously at reflux temperature, until the desired substitution of the 7-hydroxy group by chlorine is effected. Advantageously, the reaction is carried out in an inert atmosphere, e.g., under nitrogen. Carbon tetrachloride can be used effectively as the solvent vehicle but other inert solvents such as chloroform, methylene chloride, ethylene chloride, ether, benzene, and the like can be used. A satisfactory procedure is to stir the reaction mixture at room temperature for a considerable period, say from about 1 to 18 hours or as long as necessary to obtain a reasonably clear solution and then to raise the temperature to between about 50 and 100° C., for example, to the reflux temperature (77° C. for carbon tetrachloride). After the reaction is complete, usually after heating at reflux for about 1 to 5 hours, the reaction mixture is allowed to cool, advantageously under nitrogen. Any material that separates on the cooling is collected and dried. The solvent is removed by vacuum distillation at a pot temperature advantageously less than about 35° C. and the material which precipitates is collected and dried and treated with ethanol to convert any residual sulfite intermediates to the desired product. The collected material can then be further purified by solvent extraction and/or recrystallization and can be recovered either as the free base or an acid addition salt.

The proportions of the reagents can be varied widely. Stoichiometrically, however, at least 3 moles of thionyl chloride is required for each mole of starting compound. Any larger amount can be used but ordinarily it is not necessary or desirable to use more than about a 10 fold excess. Advantageously, an excess of about 2 to 3 fold is used. The amount of solvent is not critical and can be varied widely in accordance with the practices in the art. Ordinarily, from about 15 to about 30 volumes of solvent for each part of solid starting compound will suffice. The proportion of solvent to thionyl chloride, however, is important because of the solubility of the product in thionyl chloride. If the ratio of solvent to thionyl chloride (v./v.) is high, the desired product precipitates on cooling of the reaction mixture and the work up of the product is simplified. For example, with carbon tetrachloride a mixture of products precipitates directly on cooling the reaction mixture if the v./v. proportion of carbon tetrachloride to thionyl chloride is kept above about 10 to 1.

Substitution of the 7-hydroxy by iodine is effected by a modification of the Rydon reagent process. In this process, the desired halogen substitution is effected simply by mixing the starting compound of Formula II or V with triphenylphosphine and carbon tetraiodide in an inert solvent. The reaction takes place at room temperature (25° C.) but gentle heating up to reflux temperature of 50 to 60° C. can be used.

Acetonitrile and nitromethane are illustrative solvents. The triphenylphosphine and carbon tetraiodide are optimally used in equimolar proportions and advantageously in a substantial molar excess of the starting compound. Optimally about 4 moles of triphenylphosphine and 4 moles of carbon tetraiodide are used for each mole of starting compound of Formula II or V. The process can also be used for effecting chlorination and bromination by substituting carbon tetrachloride or carbon tetrabromide for the carbon tetraiodide.

Any or all of the 2-, 3-, and 4-hydroxy groups can be esterfied either before or after the halogenations, for example, with hydrocarbon carboxylic acids, advantageously of not more than 18 carbon atoms, or halo-, nitro-, hydroxy-, amino-, cyano-, thiocyano-, or alkoxy substituted hydrocarbon carboxylic acids, advantageously also of not more than 18 carbon atoms.

Example of carboxylic acid acyl radicals are the acyl radicals of the following acid: (a) saturated or unsaturated, straight or branched chain aliphatic carboxylic acids, for example acetic, propionic, butyric, isobutyric, tert-butylacetic, valeric, isovaleric, caproic, caprylic, decanoic, dodecanoic, lauric, tridecoic, myristic, pentadecanoic, palmitic, margaric, stearic, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclopentaneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (3) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxyhydrocarbon carboxylic acids include hydrocarbon carboxylic acids as given above which are substituted by one or more of halogen, nitro, hydroxy, amino, cyano, or thiocyano, containing a total of not more than 18 carbon atoms, or alkoxyhydrocarbon carboxylic acids of not more than 18 carbon atoms. Suitable such alkoxy groups include methoxy, ethoxy, propoxy, butoxy, amyloxy, hexyloxy, dodecyloxy, hexadecyloxy, and isomeric forms thereof. Examples of such substituted hydrocarbon carboxylic acids are mono-, di-, and trichloracetic acid; α- and β-chloropropionic acid; α- and γ-bromobutyric acid; α- and β-iodovaleric acid; mevalonic acid; 2- and 4-chlorocyclohexanecarboxylic acid; shikimic acid; 2-nitro-1 - methyl - cyclobutanecarboxylic acid; 1,2,3,4,5,6 - hexachlorocyclohexanecarboxylic acid; 3-bromo-2-methylcyclohexanecarboxylic acid; 4- and 5-bromo-2-methyl-cyclohexanecarboxylic acid; 5- and 6-bromo-2-methylcyclohexanecarboxylic acid; 2,3-dibromo-2-methyl-cyclohexanecarboxylic acid; 2,5-dibromo-2-methylcyclohexanecarboxylic acid; 4,5-di-bromo - 2 - methylcyclohexanecarboxylic acid; 5,6-dibromo-2-methylcyclohexanecarboxylic acid; 3-bromo-3-methylcyclohexanecarboxylic acid; 6-bromo-3-methylcyclohexanecarboxylic acid; 1,6-di-bromo-3-methyl-cyclohexanecarboxylic acid; 2-bromo-4-methylcyclohexanecarboxylic acid; 1,2-dibromo-4-methylcyclohexanecarboxylic acid; 3-bromo-2,2,3-trimethylcyclopentanecarboxylic acid; 1 - bromo - 3,5 - dimethylcyclohexanecarboxylic acid; homogentisic acid, o-, m-, and p-chlorobenzoic acid; anisic acid; salicyclic acid; p-hydroxybenzoic acid; β-resorcylic acid; gallic acid; veratric acid; trimethoxybenzoic acid; trimethoxycinnamic acid; 4,4′-dichlorobenzilic acid; o-, m-, and p-nitrobenzoic acid; cyanoacetic acid; 3,4- and 3,5-dinitrobenzoic acid; 2,4,6-trinitrobenzoic acid; thiocyanoacetic acid; cyanopropionic acid; and lactic acid. Examples of such alkoxyhydrocarbon carboxylic acids are ethoxyformic acid (ethyl hydrogen carbonate); butyloxyformic acid; pentyloxyformic acid; hexyloxyformic acid; dodecycloxyformic acid; hexadecyloxyformic acid, and the like.

Any or all of the 2-, 3-, and 4-hydroxy groups can also be etherified, for example, with alkyl, advantageously of not more than 20 carbon atoms; cycloalkyl, advantageously of from 3 to not more than 12 carbon atoms; or ylidene (e.g., 3,4-O-ylidene) group for example alkylidene, advantageously of not more than 20 carbon atoms and aramethylidine and vinylogs thereof, advantageously of not more than 12 carbon atoms. Examples of alkylidene are given above and examples of aralkylidene are furfurylidene, 5-methylfurfurylidene, benzylidene, m-tolylidene, o-tolylidene, p-tolylidene, o-chlorobenzylidene, m-chlorobenzylidene, m-bromobenzylidene, p-bromobenzylidene, p-methoxybenzylidene, m-methoxybenzylidene, o-methoxybenzylidene, 3,4-dimethoxybenzylidene, salicylylidene, p-hydroxybenzylidene, 3,4,5-trimethoxybenzylidene, piperonylidene, o-nitrobenzylidene, p-chlorobenzylidene, m-nitrobenzylidene, p-nitrobenzylidene, β-naphthylidene, p-bromobenzylidene, p-bromobenzylidene, 2,4-dichlorobenzylidene, 3-methoxy-4-hydroxy-benzylidene, terephthylidene, 3,4-dihydroxybenzylidene, and cinnamylidene.

The compounds of Formulas IA, IB, IIA, IIB, and V exist either in the protonated or non-protonated forms according to the pH of the environment. When the protonated form is intended, the compound is qualified as an acid-addition salt and when the non-protonated form is intended it is qualified as the free base. The free bases can be converted to stable acid-addition salts by neutralizing the free base with the appropriate acid to below about pH 7.0, and advantageously to about pH 2 to pH 6. Suitable acids for this purpose include hydrochloric, sulfuric, phosphoric, thiocyanic, fluosilicic, hexafluoroarsenic, hexafluorophosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicyclic, 5-phenylsalicyclic, 3-methylglutaric, orthosulfobenzoic, cyclopentanepropionic, 1,2-cyclohexanedicarboxylic, 4-cyclohexanecarboxylic, octadecenylsuccinic, octenylsuccinic, methanesulfonic, benzenesulfonic, helianthic, Reinecke's, dimethyldithiocarbamic, cyclohexylsulfamic, hexadecylsulfamic, octadecylsulfamic, sorbic, monochloroacetic, undecylenic, 4'-hydroxyazobenzene-4-sulfonic, octyldecylsulfuric, picric, benzoic, cinnamic, and like acids.

The acid-addition salts can be used for the same purposes as the free base or they can be employed to upgrade the same. For example, the free base can be converted to an insoluble salt, such as the picrate, which can be subjected to purification procedures, for example, solvent extractions and washings, chromatography, fractional liquid-liquid extractions, and crystallization and then used to regenerate the free base form by treatment with alkali or to make a different salt by metathesis. Or the free base can be converted to a water-soluble salt, such as the hydrochloride or sulfate and the aqueous solution of the salt extracted with various water-immiscible solvents before regenerating the free base form by treatment of the thus-extracted acid solution or converted to another salt by metathesis. The free bases of Formulas IA, IB, IIA, IIB, and V can be used as a buffer or as an antacid. The compounds of Formulas I, II, and V react with isocyanates to form urethanes and can be used to modify polyurethane resins. The long chain compounds, i.e., where $HR_2$ is alkyl of from 8 carbon atoms up, have surface active properties and can be used as wetting and emulsifying agents. The thiocyanic acid addition salt when condensed with formaldehyde forms resinous materials useful as pickling inhibitors according to U.S. Patents 2,425,320 and 2,606,155. The free bases also make good vehicles for toxic acids. For example, the fluosilicic acid addition salts are useful as mothproofing agents according to U.S. Patents 1,915,334 and 2,075,359 and the hexafluoroarsenic acid and hexafluorophosphoric acid addition salts are useful as parasiticides according to U.S. Patents 3,122,536 and 3,122,552.

The close analogues of 7-halo-7-deoxy lincomycin, i.e., where—$R_1H$ is cis or transalkyl of not more than 8 carbon atoms; $R_3$ is methyl or ethyl; R is alkyl of not more than 8 carbon atoms, have antibacterial properties, and some are comparable or superior to lincomycin and can be used for the same purpose as lincomycin. The corresponding compounds where $R_3$ is hydrogen have like antibacterial properties and, moreover, have improved Gram negative activity. The other analogues and isomers have similar antibacterial properties but to a lesser degree and can be used for the same purposes as lincomycin where larger amounts are not objectionable.

The following examples are illustrative of the process and products of the present invention but are not to be construed as limiting. The parts and percentages are by weight and the solvent ratios are by volume unless otherwise specified.

EXAMPLE 1

7(S)-chloro-7-deoxylincomycin [methyl 7 - chloro-6,7,8-trideoxy-6-(trans-1-methyl - 4 - propyl-L-2-pyrrolidine-carboxamido) - 1 - thio-L-threo-α-D-galacto-octopyranoside]

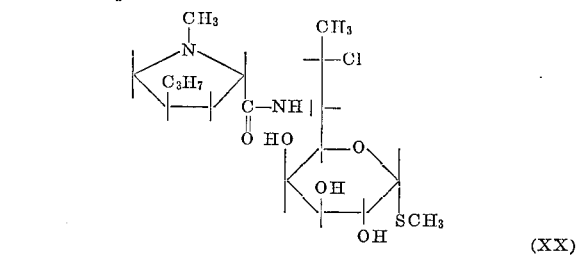

(XX)

PART A-1.—THE FREE BASE

A suspension of 221.0 g. (0.5 mole) of lincomycin hydrochloride in 5 l. of carbon tetrachloride was stirred well at 25° under nitrogen. 900 ml. of thionyl chloride was added all at once and stirring continued for 2 hr. During this period the solid dissolved and a clear solution was obtained. The reaction mixture was heated at reflux for 2 hr., the heat source then removed and nitrogen bubbled into the amber solution until the pot temperature dropped to 25°. About 4 l. of liquid was removed via vacuum distillation at a pot temperature of less than 35°. The yellow solid which precipitated during this distillation was collected and dried. This solid was dissolved in about 300 ml. of methanol, cooled at 25°, made basic (pH 11) with dilute aqueous sodium hydroxide solution ( 2 N), diluted to about 1200 ml. with water and extracted well with ether. The ether extracts were combined, washed with a small amount of water, dried over anhydrous magnesium sulfate and filtered. On evaporation of an aliquot of the combined ether extract 7(S)-chloro-7-deoxylincomycin free base is obtained as a yellow amorphous solid.

PART B-1.—THE HYDROCHLORIDE

Addition of hydrogen chloride gas to the filtrate of Part A-1 resulted in the precipitation of 7(S)-chloro-7-deoxylincomycin hydrochloride which was separated and recrystallized from ethanol and ethyl acetate. A 32% yield of white, crystalline 7(S)-chlorodeoxylincomycin hydrochloride solvated with approximately one molecular proportion of water was obtained.

Analysis.—Calcd. for $C_{18}H_{33}ClN_2O_5S \cdot HCl \cdot H_2O$: C, 45.18; H, 7.37; Cl, 14.82; N, 5.86; S, 6.70; $H_2O$, 3.77. Found: C, 44.70; H, 7.65; Cl, 14.27; N, 5.78; S, 6.45; $H_2O$, 3.85%.

$[\alpha]_D^{H_2O} + 130°$ (c.=0.9859 g./100 ml.)

Activity: About 4 to 8 times lincomycin.
Antibacterial spectrum: Same as lincomycin.

EXAMPLE 2

7(S)-chloro-7-deoxylincomycin free base

The process of Part A-1, was repeated except that methylene chloride was used in place of ether as the extracting solvent and the combined extracts were filtered and evaporated to dryness. There was obtained a 64% yield of 7(S)-chloro-7-deoxylincomycin free base as a yellow amorphous solid. 15 grams of this amorphous solid was adsorbed on 30 grams of silica gel in methylene chloride, dried, and sifted onto a 3 inch diameter column of 1500 grams of silica gel. The column was then eluted with a mixture of methanol and chloroform in the proportions of 1 to 19, respectively, in 200 ml. portions after a 2 liter forerun. Fractions 26, 27, and 28 were pooled and evaporated to dryness yielding 1.04 grams of essentially pure 7(S)-chloro-7-deoxylincomycin free base as an amorphous solid having an antibacterial spectrum of the same scope and magnitude as the 7(S)-chloro-7-deoxylincomycin hydrochloride of Example 1.

EXAMPLE 3

7(S)-chloro-7-deoxylincomycin C [ethyl 7-chloro-6,7,8-trideoxy-6-(trans-1-methyl - 4 - propyl-L-2-pyrrolidine-carboxamido) - 1 - thio-L-threo-α-D-galacto-octopyranoside]

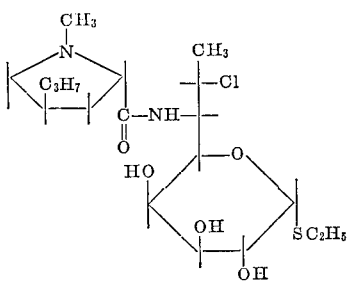

(XXI)

PART A-3.—CHLORINE SUBSTITUTION

A suspension of 1 gram of lincomycin C hydrochloride (the S-ethyl-S-demethyllincomycin hydrochloride of U.S. Patent 3,316,243) in 25 ml. of carbon tetrachloride and 4.5 ml. of thionyl chloride was stirred under nitrogen for 2 hours at 25° C. A clear solution was obtained in about 15 minutes. The reaction mixture was then heated at reflux for 2 hours and evaporated to dryness under vacuum to give a yellow solid which was dried under vacuum at 40° C. for 18 hours. The product was then dissolved in about 15 ml. of warm ethanol, made basic with sodium hydroxide as in Example 1 and diluted to 300 ml. with water. The water solution was extracted 5 times with 100 ml. portions of ether. The ether extracts were pooled, dried over magnesium sulfate, filtered, saturated with hydrogen chloride gas, and evaporated to a brown residue which on being recrystallized two times from a mixture of ethanol and ethyl acetate (dissolved in a minimum amount of ethanol and ethyl acetate added to turbidity) yielded 200 mg. of 7(S)-chloro-7-deoxylincomycin C hydrochloride as white crystals which had the same activity and spectrum as the 7(S)-chloro-7-deoxylincomycin hydrochloride of Example 1.

By substituting the ethanethiol in in Example 1 of U.S. Patent 3,316,243 by other alkyl mercaptans, for example, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl mercaptans and the isomeric forms thereof; by cycloalkyl mercaptans, for example, cyclopropyl, cyclobutyl, cyclopentyl, cyclohexyl, cycloheptyl, cyclooctyl, 2-methylcyclopentyl, 2,3-dimethylcyclobutyl, 2-methylclcbutyl and 3-cyclopentylpropyl mercaptans; or by aralkyl mercaptans, for example, benzyl, phenethyl, 3-phenylpropyl, and 1naphthylmethyl mercaptans, the corresponding alkyl, cyloalkyl, and aralkyl 6,8-dideoxy-6-(trans-1-methyl-4-propyl-L-2-pyrrolidinecarboxamido)-1-thio - D-erythro-α-D-galacto-octopyranosides are obtained, which on treatment with thionyl chloride by the above procedure are converted to the corresponding alkyl, cycloalkyl, and aralkyl 7(S)-chloro-6,7,8 - trideoxy-6-(trans-1-methyl-4-propyl-L-2-pyrrolidinecarboxamido)-1-thio-L-threo - α - D-galacto-octanopyranosides. The compounds thus obtained (both the 6,8-dideoxy and the 7-chloro-6,7,8-trideoxy compounds) wherein alkyl is propyl, butyl, pentyl, and hexyl (obtained respectively when propyl, butyl, pentyl, and hexyl mercaptans are used) are especially effective antibacterials, having the same spectrum as lincomycin and equal or greater activity.

EXAMPLE 4

Methyl 7-chloro-6,7,8 - trideoxy-6-(trans-1-alkyl-4-butyl-L-2-pyrrolidinecarboxamido)-1 - thio - L - threo-α-D-galacto-octopyranosides

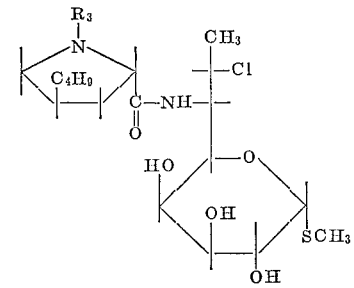

(XXII)

$R_3$ = methyl or ethyl.

PART A-4

A suspension of 116 mg. of methyl 6,8-dideoxy-6-(trans-1-ethyl - 4 - butyl-L-2-pyrrolidinecarboxamido)-1-thio-D-erythro-α-D-galacto-octopyranoside free base in 3 ml. carbon tetrachloride and 0.7 ml. of thionyl chloride was stirred at 25° C. until a clear solution was obtained (about 15 minutes) and allowed to stand at 25° C. for 2 hours. The reaction mixture was then heated at reflux for 2 hours and then evaporated to dryness under vacuum to a yellow solid which was worked up as described in Example 3. The product, however, did not crystallize so the crystallizing solvents were evaporated to yield 17 mg. of methyl 7-chloro-6,7,8-trideoxy-6-(trans-1-ethyl-4-butyl-L-2-pyrrolidinecarboxamido) - 1 - thio-L-threo-α-D-galacto-octopyranoside hydrochloride as a tan amorphous solid which assayed 8 times the activity of lincomycin against Gram-positive bacterial and 16 to 64 times that of lincomycin against Gram-negative bacteria.

*Analysis.*—Calcd. for $C_{20}H_{33}Cl_2N_2O_5S$: C, 49.07; H, 7.82; N, 5.72; S, 6.55; Cl, 14.49. Found: C, 48.38; H, 8.03; N, 5.56; S, 6.43; Cl, 15.06%. Corrected for 3.02% $H_2O$.

On substituting the cis epimer, there is obtained methyl-7-chloro - 6,7,8 - trideoxy-6-(cis-1-ethyl-4-butyl-L-2-pyrrolidinecarboxamido)-1-thio - L - threo-α-D-galacto-octopyranoside hydrochloride having the same antibacterial spectrum,

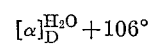

*Analysis.*—Found: C, 48.91; H, 7.91; N, 6.14; S, 5.97; Cl, 14.80%. Corrected for 5.37% $H_2O$.

On substituting the 1-methyl analogs, methyl 7-chloro-6,7,8-trideoxy-6-(cis- and trans-1-methyl-4-butyl-5-2-pyrrolidinecarboxamido)-1-thio - L - threo-α-D-galacto-octopyranosides hydrochlorides are obtained.

The cis and trans epimers used as starting materials in the above example were prepared as follows:

PART B-4.—4 - BUTYLIDENE-1-CARBOBENZOXY-L-PROLINE AND THE CYSLOHEXYLAMINE SALT THEREOF

Sodium hydride (19 g.) as a 53% suspension in mineral oil was warmed with 350 ml. of dimethyl sulfoxide at a temperature of 70–75° C. until the reaction was complete (about 30 minutes). After cooling to 32° C., 16.2 g. of butyl triphenylphosphonium bromide was added, and the resulting reaction mixture was stirred for 1 hour to insure complete reaction. A solution of 26 g. of 4-keto-1-carbobenzoxy-L-proline in 100 ml. of dimethyl sulfoxide was added, and the resulting mixture was heated at 70° C. for 3 hours. The reaction mixture was cooled to 25° C. and 1 liter of 2.5% aqueous potassium bicarbonate added. This mixture was washed twice with 700 ml. portions of ether and the ether was discarded after back extracting with 150 ml. of 2.5% aqueous potassium bicarbonate. The bicarbonate solutions were combined and acidified with 4 N hydrochloric acid. The acidified mixture was extracted with four 500-ml. portions of ether. The combined ether extracts were washed successively with 250 ml. of water, three 250-ml. portions of saturated aqueous sodium bisulfite, and 250 ml. of water, and dried over anhydrous sodium sulfate. Evaporation of the solvent under vacuum gave 24 g. of an oil residue which was 4-butylidene-1-carbobenzoxy-L-proline.

This residue was dissolved in 31 ml. of acetonitrile and treated with 18 ml. of dicyclohexylamine and refrigerated. The crystals were collected, washed with acetonitrile and dried in vacuo giving 21 g. (46.8%) of the crystalline dicyclohexylamine salt melting at 136–140° C. After two recrystallizations from acetonitrile, an analytical sample was obtained which melted at 142–144° C. and had a rotation of $[\alpha]_D -4°$ (c.=0.00, CHCl$_3$).

*Analysis.*—Calcd. for C$_{29}$H$_{44}$N$_2$O$_4$: C, 71.86; H, 9.15; N, 5.78%. Found: C, 71.69; H. 9.30; N, 5.74%.

Ten grams of the dicyclohexylamine salt of 4-butylidene-1-carbobenzoxy-L-proline was shaken with ether and excess 5% aqueous potassium hydroxide until no solid remained. The layers were separated and each one was backwashed. The aqueous alkaline layer was combined with the backwash from the ether layer and acidified with 4 N hydrochloric acid. The mixture was repeatedly extracted with ether and the ether extracts were combined, dried over sodium sulfate, and evaporated in vacuo to give 6.3 g. (93%) of 4-butylidene-1-carbobenzoxy-L-proline as an oil.

PART C-4.—4-BUTYL-1-CARBOBENZOXY-L-PROLINE

The oil from Part B–4 was hydrogenated in 200 ml. of methanol over 2.1 g. of 10% platinum on Dowex–1 catalyst under 40 lbs. hydrogen pressure. The catalyst was removed by filtration and the filtrate evaporated to yield 6.3 g. of 4-butyl-1-carbobenzoxy-L-proline as an oil. The product contained about 2 parts cis-4-butyl-1-carbobenzoxy-L-proline to each part of trans-4-butyl-1-carbobenzoxy-L-proline.

If desired, the hydrogenation of the 4-ylidene group can be postponed to any later step, even to the final step, in the process.

By substituting the butyltriphenylphosphonium bromide of Part B–4 by other substituted triphenylphosphonium bromides where the substituent is methyl, ethyl, proply, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cyclopropyl, cyclobutyl, cyclopentyl, cyclohexyl, cycloheptyl, cyclooctyl, 2-cyclopropylethyl, and 3-cyclopentylpropyl; benzyl, phenethyl, 3-phenylpropyl, and 1-naphthylmethyl, the corresponding 4-alkylidene-, 4-cycloalkylidene-, and 4-aralkylidene-1-carbobenzoxy-L-prolines and the corresponding 4-alkyl-, 4-cycloalkyl-, and 4-aralkyl-1-carbobenzoxy-L-prolines are obtained. For example, when the butyltriphenylphosphonium bromide is substituted by ethyl-, propyl-, isobutyl-, pentyl-, and hexyl-triphenylphosphonium bromides there are obtained 4-ethylidene-1-carbobenzoxy-L-proline, 4-isobutylidene-1-carbobenzoxy-L-proline, 4-pentylidene-1-carbobenzoxy-L-proline, and 4-hexylidene-1-carbobenzoxy-L-proline, and cis and trans 4-ethyl-1-carbobenzoxy - L - proline, 4 - propyl-1-carbobenzoxy-L-proline, 4 - isobutyl - 1-carbobenzoxy-L-proline, 4-pentyl-1-carbobenzoxy - L - proline, and 4-hexyl-1-carbobenzoxy-L-proline.

PART D-4.—METHYL 6-AMINO-6,8-DIDEOXY-1-THIO-D-ERYTHRO-α-D-GALACTO-OCTOPYRANOSIDE (α-MTL)

A solution of 40 g. of lincomycin free base (U.S. Patent 3,086,912) in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether. The yield of white, crystalline α-MTL free base after drying in vacuo at room temperature was 21 g. (84%). Recrystallization was accomplished by dissolving α-MTL free base in hot dimethyl formamide and adding an equal volume of ethylene glycol dimethyl ether.

Methyl 6 - amino - 6,8-dideoxy-1-thio-D-erythro-α-D-galacto-octopyranoside free base has a melting point of 225–228° C., an optical rotation of $[\alpha]_D^{25} +276°$ (c.= .768, water) and pKa' of 7.45.

*Analysis.*—Calcd. for C$_9$H$_{19}$NO$_5$S: C, 42.7; H, 7.56; N, 5.53; S, 12.66. Found: C, 42.6; H, 7.49; N, 5.75; S, 12.38%.

By substituting lincomycin by other alkyl or by cycloalkyl or aralkyl 6,8-dideoxy-6-(trans-1-methyl-4-propyl-L - 2 - pyrrolidinecarboxamido) - 1-thio-D-erythro-α-D-galacto-octopyranosides where alkyl is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cycloalkyl is cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl; and aralkyl is benzyl, phenethyl, 3-phenylpropyl, and 1-naphthylmethyl, the corresponding alkyl, cycloalkyl, and aralkyl 6-amino-6,8-dideoxy-1-thio-D-erythro-α-D-galacto-octopyranosides are obtained. For example, by substituting the lincomycin by ethyl-, propyl-, butyl-, pentyl-, and hexyl 6,8-dideoxy-6-(trans-1-methyl-4-propyl - L-2-pyrrolidinecarboxamido)-1-thio-D-erythro-α-D-galacto-octopyranosides, ethyl 6-amino-6,8-dideoxy-1-thio-D-erythro-α-D-galacto-octopyranoside, propyl 6-amino - 6,8 - dideoxy-1-thio-D-erythro-α-D-galacto-octopyranoside, butyl 6-amino-6,8-dideoxy-1-thio-D-erythro-α-D-galacto-octopyranoside, pentyl 6-amino-6,8-dideoxy-1-thio-D-erythro-α-D-galacto-octopyranoside, and hexyl 6 - amino - 6,8-dideoxy-1-thio-D-erythro-α-D-galacto-octopyranoside are obtained.

If desired, the procedure of Part A–4 can be applied to the compounds of Part D–4 using the hydrochloride or other salt of a strong acid and the resulting 7-chloro compounds processed by the ensuing steps of this example to the final products of the example.

PART E-4.—METHYL 6,8 - DIDEOXY-6-(1-CARBOBENZOXY - 4 - BUTYL-L-2-PYRROLIDINECARBOXAMIDO)-1-THIO - D - ERYTHRO-α-D-GALACTO-OCTOPYRANOSIDE FREE BASE

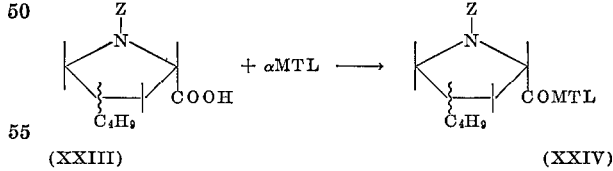

(XXIII)     (XXIV)

To a solution of 6.3 g. of 4-butyl-1-carbobenzoxy-L-proline (the oil from Part B-4) in 175 ml. of distilled acetonitrile cooled to 0° there was added 3.46 ml. of triethylamine followed by 3.34 ml. of isobutyl chloroformate. The mixture was stirred at 0° C. (±3°) for 15 min. A solution of 6.2 g. of α-MTL free base from Part C in 85 ml. of water was added, and the reaction mixture was stirred at 0° C. for 0.5 hr. and at 25° C. for 1 hr. The reaction product was then filtered and dried yielding 4.57 g. (37.7%) of methyl 6,8-dideoxy-6-(1-carbobenzoxy-4-butyl - L - 2 - pyrrolidinecarboxamido) - 1 - thio - D-erythro-α-D-galacto-octopyranoside free base. The mother liquor was concentrated under vacuum and an additional 4.25 g. (35.2%) of product recovered. Recrystallization from acetonitrile produced crystals of methyl 6,8-dideoxy-6 - (1 - carbobenzoxy - 4 - butyl - L - 2 - pyrrolidinecarboxamido) - 1 - thio - D - erythro - α - D - galacto-octopyranoside free base melting at 194–196° C. A second recrystallization from acetonitrile afforded an analytical sample, M.P. 195.5–200° C., [α]_D +111° (c., 0.98, MeOH).

*Analysis.*—Calcd. for $C_{26}H_{40}N_2O_8S$: C, 57.75; H, 7.46; N, 5.13; S, 5.93. Found: C, 57.58; H, 7.16; N, 5.50; S, 6.07%.

PART F–4.—METHYL 6,8-DIDEOXY-6-(4-BUTYL-L-2-PYRROLIDINECARBOXAMIDO) - 1 - THIO - D - ERYTHRO-α-D-GALACTO-OCTOPYRANOSIDE HYDROCHLORIDE

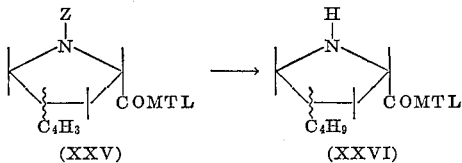

A solution of 7.8 g. of methyl 6,8-dideoxy-6-(1-carbobenzoxy - 4 - butyl - L - 2 - pyrrolidinecarboxamido) - 1-thio-D-erythro-α-D-galacto-octopyranoside free base from Part E–4 in 200 ml. of methanol was shaken over 2 g. of 10% palladium on carbon under 40 lbs. of hydrogen pressure for 17 hours. The catalyst was removed by filtration and the solution concentrated under vacuum. The residue was dissolved in a mixture of 20 ml. of acetone and 20 ml. of water and acidified with 6 N hydrochloric acid. Dilution with 4 volumes of acetone precipitated methyl 6,8 - dideoxy - 6 - (4 - butyl - L - 2 - pyrrolidinecarboxamido) - 1 - thio - D - erythro - α - D - galacto - octopyranoside hydrochloride which was collected by filtration and dried. The crystals, dried at 55° C. under vacuum, weighed 4.7 g. and melted at 188–194° C. The analytical sample obtained by recrystallization from acetone melted at 197–199° C. and gave [α]_D^25 +150° (water, c., 0.89).

*Analysis.*—Calcd. for $C_{18}H_{34}N_2O_6S \cdot HCl$: C, 48.80; H, 7.96; N, 6.23; S, 7.24. Found: (corrected for 5.54% water) C, 48.58; H, 8.19; N, 6.04; S, 7.36%.

This material possesses 8% of the antibacterial activity of lincomycin by *S. lutea* assay.

By substituting the α-MTL by other alkyl or by cycloalkyl or aralkyl 6-amino-6,8-dideoxy-1-thio-D-erythro-α-D-galacto-octopyranosides wherein alkyl is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl and the isomeric forms thereof; cycloalkyl is cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl; and aralkyl is benzyl, phenethyl, 3-phenylpropyl, and 1-naphthylmethyl, the corresponding alkyl, cycloalkyl, and aralkyl 6,8-dideoxy-6-(1-carbobenzoxy - 4 - butyl - L - 2 - pyrrolidinecarboxamido) - 1-thio-D-erythro-α-D-galacto-octopyranosides and alkyl, cycloalkyl, and aralkyl 6,8-dideoxy-6-(4-butyl-L-2-pyrrolidinecarboxamido) - 1 - thio - D - erythro - α - D - galacto-octopyranosides are obtained. For example, by substituting the α-MTL by ethyl, propyl, butyl, pentyl, and hexyl 6 - amino - 6,8 - dideoxy - 1 - thio - D - erythro - α - D-galacto-octopyranoside, there are obtained ethyl 6,8-dideoxy - 6 - (1 - carbobenzoxy - 4 - butyl - L - 2 - pyrrolidinecarboxamido) - D - erythro - α - D - galacto - octopyranoside, propyl 6,8-dideoxy-6-(1-carbobenzoxy-4-butyl-L - 2 - pyrrolidinecarboxamido) - 1 - thio - D - erythro-α - D - galacto - octopyranoside, butyl 6,8 - dideoxy-6 - (1 - carbobenzoxy-4-butyl L - 2 - pyrrolidinecarboxamido) - 1 - thio - D - erythro - α - D - galacto - octopyranoside, pentyl 6,8 - dideoxy - 6 - (1 - carbobenzoxy-4 - butyl - L - 2 - pyrrolidinecarboxamido) - 1 - thio-D-erythro - α - D - galacto - octopyranoside, hexyl 6,8-dideoxy - 6 - (1 - carbobenzoxy - 4 - butyl - L - 2 - pyrrolidinecarboxamido) - 1 - thio - D - erythro - α - D-galacto - octopyranoside, ethyl 6,8 - dideoxy - 6 - (4-butyl - L - 2 - pyrrolidinecarboxamido) - 1 - thio - D-erythro - α - D - galacto - octopyranoside, propyl 6,8-dideoxy - 6 - (4 - butyl - L - 2 - pyrrolidinecarboxamido)- 1 - thio - D - erythro - α - D - galactooctopyranoside, butyl 6,8 - dideoxy - 6 - (4 - butyl - L - 2 - pyrrolidinecarboxamido) - 1 - thio - D - erythro - α - D - galacto - octopyranoside, pentyl 6,8 - dideoxy - 6 - (4 - butyl - L - 2-pyrrolidinecarboxamido) - 1 - thio - D - erythro - α - D-galacto - octopyranoside, hexyl 6,8 - dideoxy - 6 - (4-butyl - L - 2 - pyrrolidinecarboxamido) - 1 - thio - D-erythro - α - D - galacto - octopyranoside. These alkyl, cycloalkyl, and aralkyl α-thiolincosaminides are obtained by hydrazinolysis of the corresponding S-alkyl, S-cycloalkyl, and S-aralkyl S-demethyllincomycins which are described in Example 3.

By substituting the 4-butyl-1-carbobenzoxy-L-proline of Part E by other 4-alkyl-1-carbobenzoxy-L-prolines where the 4-alkyl is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eiscosyl and the isomeric forms thereof; by 4-cycloalkyl-1-carbobenzoxy-L-prolines where 4-cycloalkyl is cyclopropyl, cyclobutyl cyclopentyl, cyclohexyl, cycloheptyl, cyclooctyl, 2-methylcyclopentyl, 2,3-dimethylcyclobutyl, 4-methylcyclobutyl, and 3-cyclopentylpropyl; and by 4-aralkyl - 1 - carbobenzoxy-L-prolines where 4-aralkyl is benzyl, phenethyl, 3-phenylpropyl, and 1-naphthylmethyl, the corresponding alkyl, cycloalkyl, and aralkyl 6,8-dideoxy - 6 - (1-carbobenzoxy-4-alkyl, 4-cycloalkyl, and 4-aralkyl-L - 2-pyrrolidinecarboxamido)-1-thio-D-erythro-α-D-galacto-octopyranosides, and the corresponding alkyl, cycloalkyl, and aralkyl-6-(4-alkyl, 4-cycloalkyl, 4-aralkyl-L - 2 - pyrrolidinecarboxamido) - 1-thio-D-erythro-α-D-galacto-octopyranosides are obtained. For example, by substituting the 4-butyl-1-carbobenzoxy-L-proline by 4-methyl-, 4-ethyl-, 4-propyl-, 4-pentyl-, and 4-hexyl-1-carbobenzoxy-L-prolines, there are obtained methyl, ethyl, propyl, butyl, pentyl, and hexyl 6,8,-dideoxy-6-(1-carbobenzoxy - 4-methyl-L-2-pyrrolidinecarboxamido)-1-thio-D-erythro-α-D-galacto-octopyranosides; methyl, ethyl, propyl, butyl, pentyl, and hexyl 6,8-dideoxy-6-(1-carbobenzoxy - 4-ethyl-L-2-pyrrolidinecarboxamido)-1-thio-D-erythro - α - D-galacto-octopyranosides; methyl, ethyl, propyl, butyl, pentyl, and hexyl 6,8-dideoxy-6-(1-carbobenzoxy - 4 - propyl-L-2-pyrrolidinecarboxamido)-1-thio-D-erythro - α - D-galacto-octopyranosides; methyl, ethyl, propyl, butyl, pentyl, and hexyl, 6,8-dideoxy-6-(1-carbobenzoxy - 4 - pentyl-L-2-pyrrolidinecarboxamido)-1-thio-D-erythro - α - D-galacto-octopyranosides; methyl, ethyl, propyl, butyl, pentyl, and hexyl 6,8-dideoxy-6-(1-carbobenzoxy - 4-hexyl-L-2-pyrrolidinecarboxamido)-1-thio-D-erythro - α - D-galacto-octopyranosides; methyl, ethyl, propyl, butyl, pentyl, and hexyl 6,8-dideoxy-6-(4-methyl-L - 2 - pyrrolidinecarboxamido) - 1 - thio-D-erythro-α-D-galacto-octopyranosides; methyl, ethyl, propyl, butyl, pentyl, and hexyl 6,8-dideoxy-6-(4-ethyl-L-2-pyrrolidinecarboxamido) - 1 - thio-erythro-α-D-galacto-octopyranosides; methyl, ethyl, propyl, butyl, pentyl, and hexyl 6,8-dideoxy - 6 - (4-propyl-L-2-pyrrolidinecarboxamido)-1-thio-D-erythro-α-D-galacto-octopyranosides; methyl, ethyl, propyl, butyl, pentyl, and hexyl 6,8-dideoxy-6-(4-pentyl-L-2 - pyrrolidinecarboxamido) - 1-thio-D-erythro-α-D-galacto-octopyranosides; and methyl, ethyl propyl, butyl, pentyl, and hexyl 6,8-dideoxy-6-(4-hexyl-L-2-pyrrolidinecarboxamido) - 1-thio-D-erythro-α-D-galacto-octopyranosides.

Also by substituting the 4-butyl-1-carbobenzoxy-L-proline in Part E-4 by 1-carbobenzoxy-L-proline, the corresponding alkyl, cycloalkyl, and aralkyl 6,8-dideoxy-6-(1-carbobenzoxy-L - 2 - pyrrolidinecarboxamido)-1-thio-D-erythro-α-D-galacto-octopyranosides and the corresponding alkyl, cycloalkyl, aralkyl 6,8-dideoxy-6-(L-pyrrolidinecarboxamido) - 1-thio-D-erythro-α-D-galacto-octopyranosides are obtained.

If desired, the 1-carbobenzoxy compounds prepared according to Part E-4 can be chlorinated by the procedure of Part A-4 and the resulting 4-chloro compound processed by the ensuing steps of the example to remove the 1-carbobenzoxy group and to substitute the proline nitrogen to give the final products of the example.

PART G1–4.—METHYL 6,8-DIDEOXY-6-(1-METHYL-4-BUTYL - L - 2 - PYRROLIDINECARBOXAMIDO)-1-THIO-D-ERYTHRO-α-D-GALACTO - OCTOPYRANOSIDE HYDROCHLORIDE

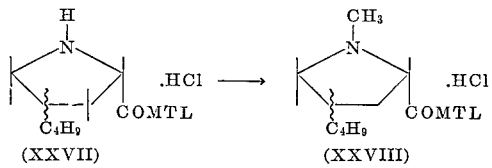

A solution of 2.0 g. of methyl 6,8-dideoxy-6-(4-butyl-L - 2 - pyrrolidinecarboxamido)-1-thio-D-erythro-α-D-galacto-octopyranoside hydrochloride from Part F–4 and 2.0 ml. of 37% formalin in 150 ml. of methanol was shaken over 500 mg. of 10% palladium on carbon under 40 lbs. of hydrogen pressure for 3.5 hrs. Removal of the catalyst by filtration and the solvent by distillation in vacuo yielded partially crystalline methyl 6,8-dideoxy-6-(1 - methyl - 4-butyl-L-2-pyrrolidinecarboxamido)-1-thio-D - erythro - α-D-galacto-octopyranoside hydrochloride which by TLC (thin layer chromatography) on silica gel using a mixture of ethyl acetate, acetone, water (8:4:1) for elution and KMnO$_4$ solution for detection consisted chiefly of two materials, the cis and trans epimers of methyl 6,8 - dideoxy-6-(1-methyl-4-butyl-L-2-pyrrolidinecarboxamido) - 1 - thio-D-erythro-α-D-galacto-octopyranoside hydrochloride in a ratio of about 3 to 2.

PART G2–4.—SEPARATION OF THE CIS AND TRANS FORM BY CHROMATOGRAPHY

The methyl 6,8 - dideoxy-6-(1-methyl-4-butyl-L-2-pyrrolidinecarboxamido) - 1 - thio-D-erythro-α-D-galacto-octopyranoside hydrochloride from Part G1–4 were dissolved in a mixture of methanol and methylene chloride (1:1) and 1.5 ml. of triethylamine added. To this solution was added 7 g. of silica gel and the solvent evaporated under vacuum leaving the antibiotic deposited on the silica gel which was sifted on top of a chromatographic column of 200 grams of silica gel packed with a solvent mixture consisting of ethyl acetate, acetone, water in a ratio of 8:4:1. The column was developed by eluting with the same solvent and 20 ml. portions were collected. Thin layer chromatograhpy of each fraction showed that fractions 31–38, 310 mg., were essentially pure trans epimer, that fractions 49–74, 32 mg., were essentially pure cis epimer, and that fractions 39–48 consisted of a mixture of epimers. The latter could be further separated by repeated chromatography. Each epimer was dissolved in a few drops of dilute hydrochloric acid and the hydrochloride precipitated by addition of acetone. In this manner, there was obtained 50 mg. of methyl 6,8-dideoxy-6-(trans-1 - methyl - 4-butyl-L-2-pyrrolidinecarboxamido)-1-thio-D-erythro - α - D-galacto-octopyranoside hydrochloride, M.P. 135–137°, and about 150 mg. of methyl 6,8-dideoxy - 6 - (cis-1-methyl-4-butyl-L-2-pyrrolidinecarboxamido)-1-thio-D-erythro-α-D-galacto-octopyranoside hydrochloride, softening at 105° C. with further melting at 175–185° C.

The trans epimer recrystallized from the same solvent melted at 139–141° C. and had the following analysis:

Analysis.—Calcd. for $C_{19}H_{36}N_2O_6S \cdot HCl$: C, 49.93; H, 8.16; N, 6.13; S, 7.02 Found: (Corrected for 4.07% H$_2$O); C, 48.81; H, 8.54; N, 6.49; S, 6.67%.

Similarly, recrystallization of the cis epimer gave a product softening at 108° C. and further at about 189° C. (solvated) with the following analysis:

Analysis.—Found: (Corrected for 4.95% water) C, 50.27; H, 9.00; N, 6.05; S, 6.65%.

The trans epimer was about 2.2 times as active as lincomycin by S. lutea assay, about 2 times as active by the broth dilution assay, and 2.5 times as active in mice infected with S. aureus.

The cis epimer was about ½ to ⅓ as active as the trans epimer, being about equal to lincomycin.

PART H1–4.—METHYL 6,8-DIDEOXY-6-(1-ETHYL-4-BUTYL - L - 2 - PYRROLIDINECARBOXAMIDO)-1-THIO-D-ERYTHRO-α-D-GALACTO - OCTOPYRANO-PYRANOSIDE HYDROCHLORIDE

A mixture of 2.0 g. of methyl 6,8-dideoxy-6-(4-butyl-L - 2 - pyrrolidinecarboxamido)-1-thio-D-erythro-α-D-galactooctopyranoside hydrochloride from Part F–4, 1.5 ml. of acetaldehyde, 150 mg. of 10% palladium on carbon in 150 ml. of methanol was shaken under 35 lbs. of hydrogen pressure for 5.5 hrs. The catalyst was removed by filtration to give a residue consisting chiefly of the cis and trans epimers of methyl 6,8-dideoxy-6-(1 - ethyl-4-butyl-L-2-pyrrolidinecarboxamido)-1-thio-D-erythro-α-D-galactooctopyranoside hydrochloride.

PART H2–4.—SEPARATION OF EPIMERS

As described in Part G2–4, the mixture of epimers of Part H1–4 (2 g.) was chromatographed over 200 g. of silica gel using for elution a solvent system of ethyl acetate, acetate, water (8:4:1). Fractions 33–42 by TLC were pure trans-epimer and were combined, fractions 49–64 were essentially pure cis-epimer and were also combined. Fractions 43–48 were a mixture of the epimers which could be purified by rechromatography. Each epimer was dissolved in a few drops of dilute hydrochloric acid and the crystalline hydrochloride precipitated on dilution with a large volume of ether.

The crude trans epimer fraction of 415 mg. gave 340 mg. (15.4%) of crystalline methyl 6,8-dideoxy-6-(trans-1 - ethyl-4-butyl-L-2-pyrrolidinecarboxyamido)-1-thio-D-erythro-α-D-galactooctopyranoside hydrochloride, M.P. 144–151° C. Recrystallization from dilute acetone raised the M.P. to 148–151° C.

The cis epimer fraction of 645 mg. afforded 300 mg. (14.1%) of crystalline methyl 6,8-dideoxy-6-(cis-1-ethyl-4 - butyl-L - 2-pyrrolidinecarboxamido)-1-thio-D-erythro-α-D-galacto-octopyranoside hydrochloride, M.P. 135–139° C. Recrystallization from dilute acetone gave crystals, M.P. 134–138° C.

The trans epimer isomer showed about 1–1.2 times the activity of lincomycin by the S. lutea assay, 2–4 times the activity of lincomycin against Gram-positive organisms, and 8 times or more the activity of lincomycin against Gram-negative organisms. In mice against S. aureus the trans epimer about 2 times as active as lincomycin. The cis epimer was about ½ as active as the trans epimer.

EXAMPLE 5

7(S)-bromo-7-deoxylincomycin and its hydrobromide

A solution of Rydon reagent was prepared by stirring a dry solution of 52.6 g. (0.2 M) of triphenylphosphine and 800 ml. of acetonitrile at 30° under nitrogen and 10 ml. (0.19 M) of bromine added over a 20-min. period. After stirring for 10 min. more, 8.2 g. of lincomycin was added and the reaction stirred at 30° for 18 hr. A white solid was then present. The reaction was filtered and the solid discarded. Methanol (100 ml.) was added to the filtrate and the solvents then evaporated under vacuum. The viscous residue was dissolved in 100 ml. methanol, diluted with 1800 ml. of water and extracted six times with 200 ml. portions of ether. The ether extracts were discarded, the aqueous phase made basic (pH 11) with aqueous KOH and then extracted four times with 200 ml. portions of methylene chloride. The extracts were dried and evaporated, leaving 11 g. of a yellow solid which was chromatographed over 1 kg. of silica gel using methanol:chloroform 1:9 (v/v.) as the solvent system. After a forerun of 1200 ml., 22 fractions of 56 ml. were collected. The last 6 (fractions 17–22) were pooled and evaporated to dryness yielding 2.8 g. of 7(S)-bromo-7-deoxylincomycin. This was converted to the hydrobromide by dissolving in water, adding HBr to pH 1, filtering, and lyophilizing the filtrate. The hydrobromide had an $\alpha_D + 114°$ (c., 0.9314, $H_2O$) and the following analysis:

Calcd. for $C_{18}H_{34}Br_2N_2O_5S$: C, 39.28; H, 6.23; N, 5.09; S, 5.83; Br, 29.04. Found: C, 39.64; H, 6.19; N, 5.07; S, 6.04; Br, 28.59%.

In place of bromine, there can be substituted other halogens. Chlorine, for example yields 7(S)-chloro-7-deoxy-lincomycin which is identical with the product of Example 1. In place of triphenylphosphine there can be substituted triphenyl phosphite. Also, in that case a methyl halide can be used in the place of halogen. In place of the lincomycin, there can be substituted other lincomycins and analogs thereof. Thus, when lincomycin C is substituted for lincomycin, 7(S)-bromo-7-deoxy-lincomycin C are obtained.

By substituting the ethanethiol in Example 1 of U.S. Patent 3,316,243 by other alkyl mercaptans, for example, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl mercaptains and the isomeric forms thereof; by cycloalkyl mercaptans, for example, cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl and 3-cyclopentylpropyl mercaptans; or by aralkyl mercaptans, for example, benzyl, phenethyl, 3-phenylpropyl, and α-naphthylmethyl mercaptans, the corresponding alkyl, cycloalkyl, and aralkyl 6,8-dideoxy-6-(trans - 1 - methyl-4-propyl-L-2-pyrrolidinecarboxamido) - 1-thio-D-erythro-α-D-galacto-octopyranosides are obtained, which on treatment with Rydon reagent by the above procedure are converted to the corresponding alkyl, cycloalkyl, and aralkyl 7(S)-halo-6,7,8-trideoxy-6-(trans - 1-methyl-4- propyl-L-2-pyrrolidinecarboxamido)-1-thio-L - threo - α - D-galacto-octanopyranosides. The 7-chloro compounds thus obtained are the same as those described above. The 7-bromo analogs wherein alkyl is propyl, butyl, pentyl, and hexyl (obtained respectively when propyl, butyl, pentyl, and hexyl mercaptans are used) are especially effective antibacterials, having the same spectrum as lincomycin and equal or greater activity.

Also, when the lincomycin is substituted by methyl 6,8 - di-deoxy-6-(trans-1-methyl- or 1 - ethyl-butyl-L-2-pyrrolidine-carboxamido) - 1 - thio - D - erythro-α-D-galacto-octopyranoside, the corresponding 7 - bromo-7-deoxy compound, methyl 7-bromo - 6,7,8 - tri-deoxy-6-(trans - 1 - methyl and 1-ethyl-4--butyl-L-2-pyrolidine-carboxamido)-1-thio - L-threo-α-D-galacto - octopyranosides are obtained having the same antibacterial spectrum as lincomycin and equal or greater activity.

On substituting the cis isomers, there are obtained methyl 7-bromo-6,7,8-trideoxy-6-(cis-1-methyl and 1 - ethyl-4 - butyl - L - 2-pyrrolidinecarboxamido)-1-thio-L-threo-α-D-galacto-octopyranosides having the same antibacterial spectrum.

The cis and trans isomers used as starting materials in the above examples were prepared as described in Example 4.

EXAMPLE 6

7(S) - iodo-7-deoxylincomycin[methyl 7 - iodo-6,7,8-trideoxy-6-(trans-1-methyl-4-propyl - L - 2-pyrrolidine-carboxamido)-1-thio-L-threo-α-D-galacto - octopyranoside]

A mixture of lincomycin·HCl (20 g.—0.045 mole), acetonitrile (200 ml.), carbon tetraiodide (100 g.—0.192 mole) and triphenylphosphine (51 g.—0.195 mole) was stirred at 25° for 18 hours, filtered and the filtrate evaporated to dryness under vacuum. The residual oil was shaken well with 1 liter of $CCl_4$ plus 1 liter of aqueous 0.1 N HCl solution. The $CCl_4$ phase was discarded. The aqueous phase was extracted with $CCl_4$ and the extracts discarded. The aqueous phase was filtered, made basic (pH 11) by addition of 4N NaOH aqueous solution and then extracted with $CHCl_3$. The $CHCl_3$ extracts were combined and evaporated to dryness under vacuum to give 12.5 g. of white solid. This material was purified by repeated chromatography over silica gel using a solvent system composed of $CHCl_3:CH_3OH$ (7:1 by volume). The purified product was converted to its hydrochloride salt and recrystallized from ethanol to give 100 mg.— 0.5% yield—of 7(S) - iodo-7 - deoxylincomycin hydrochloride as white crystals.

By substituing the carbon tetraiodide by carbon tetrabromide and carbon tetrachloride, 7(S)-bromo- and 7(S)-chloro-7-deoxylincomycins are obtained. By substituting lincomycin analogs, the corresponding 7(S)-chloro-, 7(S)-bromo-, and 7(S)-iodo lincomycin analogs are obtained.

Separation of the cis- and trans-isomers is not a necessary step as the 7-halo derivatives of the mixed epimers are useful per se. It is desirable, however, to keep the content of transisomer high as this is the most active form. By carrying out the process with this in mind mixed epimeric products containing a ratio of trans- and cis-epimers of 3:1 to 1:5 can readily be obtained. By substituting the formaldehyde and acetaldehyde of Parts G–4 and H–4 by other oxo compounds of the formula $R_4R_5CO$, for example, propionaldehyde, acetone, butyraldehyde, isobutyl methyl ketone, benzaldehyde, phenylacetaldehyde, hydrocinnamaldehyde, acetophenone, propiophenone, butyrophenone, 3-methyl-4-phenyl-2-butanone, 2-methyl-5-phenyl-3-pentanone, 3-cyclopentanepropionaldehyde, cyclohexaneacetaldehyde, cycloheptanecarboxaldehyde, 2,2-dimethylcyclopropaneacetaldehyde, 2,2-dimethylcyclopropyl methyl ketone, cyclopentyl methyl ketone, cyclobutyl methyl ketone, cyclobutanone, cyclohexanone, and 4-methylcyclohexaneone, and using the appropriate alkyl, cycloalkyl, or aralkyl 6,8-dideoxy-6-(4-alkyl, 4-cycloalkyl-, or 4-aralkyl - L - 2 - pyrrolidinecarboxamido)-1-thio-D-erythro-α-D-galacto-octopyranoside, there are obtained the corresponding alkyl, cycloalkyl, and aralkyl 6, 8-dideoxy-6-(1-$R_4R_5$CH-4-alkyl, 4-cycloalkyl, and 4-aralkyl-L-2-pyrrolidinecarboxamido) - 1 - thio-D-erythro-α-D-galacto octopyranoside which on treatment with Rydon reagent or thionyl chloride gives the corresponding alkyl, cycloalkyl, and aralkyl 7-halo-6,7,8-trideoxy-6-(1-$R_4R_5$CH-4-alkyl-, 4-cycloalkyl-, and 4-aralkyl-L-2-pyrrolidinecarboxamido) - 1-thio-α-D - galacto-octopyranoside where $R_4R_5$CH- is propyl, isopropyl, butyl, and 4 - methyl-2-pentyl; benzyl, phenethyl, 3-phenylpropyl, 2-phenylethyl, 1-phenylpropyl, 1-phenylbutyl, 3-methyl-4-phenyl-2-butyl, and 2 - methyl-5-phenyl-3-pentyl; 3-cyclopentylpropyl, 2-cyclohexylethyl, cycloheptylmethyl, 2-(2,2-dimethylcyclopropyl)ethyl, 1-(2,2 - dimethylcyclopropyl)ethyl, 1-cyclopentylethyl, 1-cyclobutylethyl, cyclobutyl, cyclohexyl, and 4-methylcyclohexyl. By using formaldehyde and acetaldehyde or other alkanals, for example, propionaldehyde, butyraldehyde, valeraldehyde, or capric aldehyde with an alkyl 6,8-dideoxy-6-(4 - alkyl-L-2 - pyrrolidinecarboxyamido) - 1-thio-D-erythro-α-D-galacto - octopyranoside where alkyl and 4-alkyl are methyl, ethyl, propyl, butyl, pentyl, or hexyl preferred starting compounds of the formula

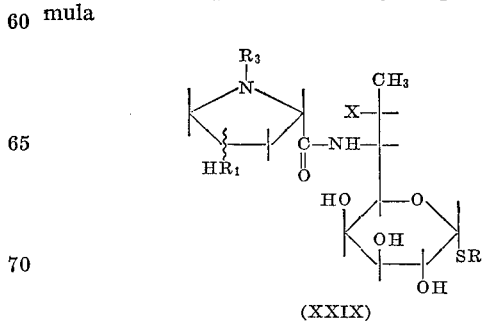

(XXIX)

wherein X is hydroxy and R, $HR_1$, and $R_3$ are alkyl of not more than six carbon atoms, advantageously of not more than twelve carbon atoms in the aggregate are obtained which on halogenation give compounds according to the formula:

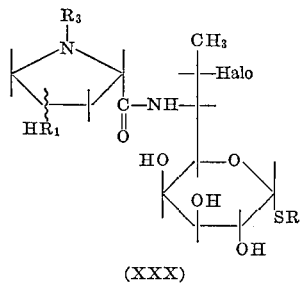

(XXX)

where Halo is halogen and R, $HR_1$, and $R_3$ are alkyl as given above. The 6,8-dideoxy compounds of Formula XXIX as characterized above are active antibacterials comparable with lincomycin. The 7(S)-halo-6,7,8-trideoxy compounds of Formula XXI as characterized above have the same spectrum of antibacterial activity but are substantially more active. Representative compounds of Formula XXX wherein X is chlorine, bromine, and iodine are given in the following table:

TABLE 1.—COMPOUNDS OF FORMULA XXX WHERE HALO IS CHLORINE, BROMINE, AND IODINE

| | R | $HR_1$ | $R_3$ |
|---|---|---|---|
| A | Methyl | Trans-ethyl | Methyl. |
| B | do | Cis-ethyl | Do. |
| C | 7(S)-halo-7-deoxylincomycin | do | Trans-propyl | Do. |
| D | 7(S)-halo-7-deoxyallolincomycin | do | Cis-propyl | Do. |
| E | 7(S)-halo-7-deoxylincomycin E) | do | Trans-propyl | Ethyl. |
| F | 7(S)-halo-7-deoxyallolincomycin E) | do | Cis-propyl | Do. |
| G | | Ethyl | Trans-propyl | Methyl. |
| H | | do | Cis-propyl | Do. |
| I | | Methyl | Trans-butyl | Do. |
| J | | do | Cis-butyl | Do. |
| K | | do | Trans-propyl | Ethyl. |
| L | | do | Cis-propyl | Do. |
| M | | Ethyl | Trans-propyl | Do. |
| N | | do | Cis-propyl | Do. |
| O | | Methyl | Trans-butyl | Do. |
| P | | do | Cis-butyl | Do. |
| Q | | do | Trans-pentyl | Methyl. |
| R | | do | Cis-pentyl | Do. |
| S | | Ethyl | Trans-butyl | Ethyl. |
| T | | do | Cis-butyl | Do. |
| U | | Methyl | Trans-pentyl | Do. |
| V | | do | Cis-pentyl | Do. |
| W | | Ethyl | Trans-pentyl | Methyl. |
| X | | do | Cis-pentyl | Do. |
| Y | | Methyl | Trans-hexyl | Do. |
| Z | | do | Cis-hexyl | Do. |
| AA | | Butyl | Trans-propyl | Do. |
| AB | | do | Cis-propyl | Do. |
| AC | | Ethyl | Trans-pentyl | Ethyl. |
| AD | | do | Cis-pentyl | Do. |
| AE | | Butyl | Trans-butyl | Do. |
| AF | | do | Cis-butyl | Do. |
| AG | | do | Trans-pentyl | Methyl. |
| AH | | do | Cis-pentyl | Do. |
| AI | | Cyclohexyl | Trans-propyl | Do. |
| AJ | | do | Cis-propyl | Do. |
| AK | | Butyl | Trans-pentyl | Ethyl. |
| AL | | do | Cis-pentyl | Do. |
| AM | | Pentyl | Trans-pentyl | Do. |
| AN | | do | Cis-pentyl | Do. |
| AO | | Methyl | Trans-heptyl | Methyl |
| AP | | do | Cis-heptyl | Do. |
| AQ | | do | Trans-octyly | Do. |
| AR | | do | Cis-octyl | Do. |

Intermediates for the preparation of the above compounds correspond to the above table where in Formula XXX (1) X is hydroxy; (2) $R_3$ is hydrogen; (3) X is hydroxy and $R_3$ is hydrogen; (4) X is hydroxy and $R_3$ is carbobenzoxy; (5) X is hydroxy, $R_3$ is carbobenzoxy, and $HR_1$ and H in the 4-position are replaced by the ylidene group, $R_1$; (6) X is hydroxy, $R_3$ is hydrogen, and $HR_1$ and H in the 4-position are replaced by the ylidene group, $R_1$; (7) X is hydroxy, and $HR_1$ and H in the 4-position are replaced by the ylidene group, $R_1$; and in Formula XXI where (8) X is chlorine, bromine, or iodine and $R_3$ is carbobenzoxy; (9) X is chlorine, bromine, or iodine, $R_3$ is carbobenzoxy, and $HR_1$ and H in the 4-position are replaced by the ylidene group, $R_1$; (10) X is chlorine, bromine, or iodine, $R_3$ is hydrogen, and $HR_1$ and H in the 4-position are replaced by the ylidene group, $R_1$; and (11) X is chlorine, bromine, or iodine, and $HR_3$ and H in the 4-position are replaced by the ylidene group, $R_1$.

By starting with intermediates where $R_3$ is hydrogen or a protective group removable by hydrogenolysis or solvolysis, the same compounds as given in Table I are obtained except that $R_3$ is hydrogen or the protective group. Illustrative process for producing such compound are as follows:

EXAMPLE 7

*Methyl 7 - chloro - 6,7,8 - trideoxy-6-(trans-4-butyl-L-2-pyrrolidinecarboxamido) - 1 - thio - L - threo - α - D-galacto-octopyranoside*

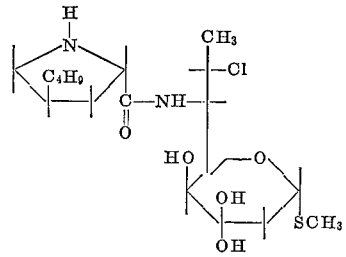

(XXXI)

A suspension of 116 mg. of methyl 6,8-dideoxy-6-(trans - 4 - butyl-L-2-pyrrolidinecarboxamido)-1-thio-D-erythro-α-D-galacto-octopyranoside free base in 3 ml. carbon tetrachloride and 0.7 ml. of thionyl chloride was stirred at 25° C. until a clear solution was obtained (about 15 minutes) and allowed to stand at 25° C. for 2 hours. The reaction mixture was then heated at reflux for 2 hours and then evaporated to dryness under vacuum to give a yellow solid which was dried under vacuum at 40° C. for 18 hours. The product was then dissolved in about 15 ml. of warm ethanol, made basic with sodium hydroxide as in Example 1 and diluted to 300 ml. with water. The water solution was extracted 5 times with 100 ml. portions of ether. The ether extracts were pooled, dried over magnesium sulfate, filtered, saturated with hydrogen chloride gas, and evaporated to yield methyl 7 - chloro - 6,7,8 - trideoxy-6-(trans-4-butyl-L-2-pyrrolidinecarboxamido) - 1 - thio - L - threo-α-D-galacto-octopyranoside hydrochloride as a tan amorphous solid which assayed at least 8 times the activity of lincomycin.

On substituting the cis epimer, there is obtained methyl 7-chloro - 6,7,8 - trideoxy-6-(cis-4-butyl-L-2-pyrrolidinecarboxamido)-1-thio - L - threo-α-D-galacto-octopyranoside hydrochloride having the same antibacterial spectrum.

EXAMPLE 8

7(S)-chloro-7-deoxylincomylcin D [methyl 7-chloro-6,7,8-trideoxy-6-(trans - 4 - propyl-L-2-pyrrolidinecarboxamido)-1-thio-L-threo-α-D-galacto-octopyranoside]

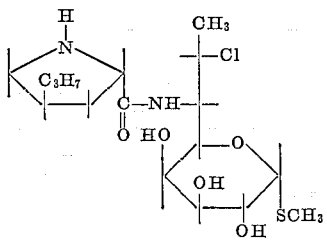

Chlorine was bubbled into a suspension of 11 g. of triphenylphosphine in 200 ml. of acetonitrile until an uptake of 2.84 g. was noted. The reaction mixture was cooled to 26° and 1.72 g. of N-demethyllincomycin hydrochloride (lincomycin D hydrochloride U.S. Patent 3,329,568) added. The solution was stirred at ambient temperature for 18 hours. After adding 10 ml. of methanol, the solvent was distilled in vacuo. The residue was stirred with 100 ml. of ethyl acetate-ether (1:1). The mixture was filtered and the residue partitioned between 15 ml. of ethyl acetate and 15 ml. of water. The ethyl acetate was washed once with 10 ml. water and the combined aqueous extracts back-washed with ethyl acetate. The aqueous solution afforded a residue of 3.05 g. on lyophilization. This solid was dissolved in methanol, 10 g. of silica gel added and the solvent evaporated, to yield a free flowing powder. This powder was placed on top of a chromatographic column of 100 g. of silica gel and the column eluted with chloroform-methanol, 4:1. The fractions containing the product, as monitored by TLC, were combined and evaporated to give a crude material weighing 1.27 g. This solid was dissolved in acetone and acidified with dilute hydrochloric acid. 7(S)-chloro-7-deoxy-N-demethyllincomycin hydrochloride, M.P. 212–216°, weighing 0.73 g., was deposited on cooling. Recrystallization from acetone-water gave 550 mg. of 7(S)-chloro-7-deoxy-N-demethyllincomycin hydrochloride, M.P. 217–221° dec.

Analysis.—Calcd. for $C_{17}H_{31}ClN_2O_5S \cdot HCl$: C, 45.62%; H, 7.2%; N, 6.26%; S, 7.17%. Found: C, 45.89%; H, 7.66%; N, 6.55%; S, 7.17%.

7(S) - chloro - 7 - deoxy - N - demethyllincomycin hydrochloride is about 8 times as active as lincomycin against Gram-positive bacteria and at least 8 times as active Gram-negative bacteria. It is about 2 times as active as 7(S) - chloro - 7 - deoxylincomycin. This is unexpected because N-demethyllincomycin is less active than lincomycin.

By substituting bromine for chlorine, 7(S)-bromo-7-deoxy-N-demethyllincomycin was obtained. In place of triphenylphosphine there can be substituted triphenylphosphite. Also, in that case a methyl halide can be used in place of halogen.

EXAMPLE 9

The procedure of Example 8 was repeated using lincomycin K (S - ethyl - N,S - didemethyllincomycin) hydrochloride in place of lincomycin D hydrochloride yielding 7(S)-chloro-7-deoxylincomycin K and its hydrochloride.

The lincomycin K was prepared as described in U.S. application Ser. No. 399,802, filed Sept. 28, 1964.

EXAMPLE 10

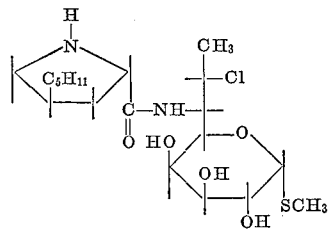

PART A–10.—METHYL 7-CHLORO - 6,7,8 - TRIDEOXY-6-(TRANS- AND CIS-4-PENTYL-L-2-PYRROLIDINECARBOXAMIDO) - 1 - THIO-L-THREO-α-D-GALACTO-OCTOPYRANOSIDE

To a colorless solution of triphenylphosphine dichloride prepared by treating 22 g. triphenylphosphine in 400 ml. of acetonitrile with 5.68 g. of chlorine, there was added 4 g. of methyl 6,8 - dideoxy - 6 - (trans- and cis - 4 - pentyl - L - 2 - pyrrolidinecarboxamido) - 1 - thio - D - erythro - α - D - galacto - octopyranoside hydrochloride. (A mixture of cis and trans isomers having a melting point of 212–214° C.) After stirring at 26° C. for 18 hours, 15 ml. of methanol was added and the solution distilled in vacuo. The residue was shaken with 250 ml. of ethylacetate-ether (1:1) and filtered. The residue, 13.7 g., was partitioned between water and ethyl acetate and the product recovered from the aqueous solution by lyophilizing. This lyophilate, 8.5 g., was further purified by chromatography over silica gel using chloroform-methanol (4:1) for elution. A major fraction of 2.09 g. was dissolved in acetone and acidified with hydrochloric acid, filtered, and dried to yield 1.15 g. (27.6%) of methyl 7 - chloro - 6,7,8 - trideoxy - 6 - (trans- and cis - 4 - pentyl - L - 2 - pyrrolidinecarboxamido) - 1 - thio - L - threo - α - D - galacto - octopyranoside hydrochloride. Melting point 222–223° C. dec., $[\alpha]_D +139° (H_2O)$.

Analysis.—Calculated for $C_{19}H_{36}Cl_2N_2O_5S$: C, 47.99%; H, 7.63%; N, 5.89%; S, 6.74%. Found (corrected for 0.58% water): C, 47.85%; H, 7.84%; N, 6.01%; S, 6.80%.

The mixture of cis and trans isomers used as starting material in this example was prepared as follows:

PART B-10.—4-PENTYLIDENE-1-CARBOBENZOXY-L-PROLINE AND THE DICYCLOHEXYLAMINE SALT THEREOF

Following the procedure of Part B–4 substituting the butyltriphenylphosphonium bromide by pentyltriphenylphosphonium bromide, 4 - pentylidene - 1 - carbobenzoxy-L-proline and the dicyclohexylamine salt thereof were obtained. The free acid was an oil but the dicyclohexylamine salt after recrystallization from acetonitrile had a melting point of 124–128° C., an optical rotation of $[\alpha]_D -6°$ (c., 0.762, $CHCl_3$), and the following analysis:

Calcd. for $C_{30}H_{46}N_2O_4$: C, 72.25; H, 9.30; N, 5.62. Found: C, 72.38; H, 9.52; N, 5.97%.

PART C–10.—4-PENTYL-1-CARBOBENZOXY-L-PROLINE

Hydrogenation of the oily free acid from Part B–10 by the procedure of Part C–4 gave 4-pentyl-1-carbobenzoxy-L-proline as an oil.

PART D–10.—METHYL 6,8-DIDEOXY - 6 - (4 - PENTYL-1-CARBOBENZOXY-L-2 - PYRROLIDINECARBOXAMIDO)-1-THIO-D-ERYTHRO-α-D-GALACTO-OCTOPYRANOSIDE

Following the procedure of the Part E–4 substituting the 4-butyl-1-carbobenzoxy-L-proline by 4-pentyl-1-carbobenzoxy-L-proline (the oil of Part C–10), there was obtained methyl 6,8 - dideoxy-6-(4-pentyl-1-carbobenzoxy-L-2-pyrrolidinecarboxamido) - 1 - thio - D - erythro-α-D-galacto-octopyranoside having a melting point of 191–193° C., an optical rotation of $[\alpha]_D +108°$ (c.=0.722, MeOH) and the following analysis:

Calcd. for $C_{27}H_{42}N_2O_8S$: C, 58.46; H, 7.63; N, 5.05. Found: C, 58.32; H, 7.52; N, 4.95%.

PART E–10.—METHYL 6,8-DIDEOXY - 6 - (4-PENTYL-L-2-PYRROLIDINECARBOXAMIDO) - 1 - THIO-D-ERYTHRO-α-D-GALACTO-OCTOPYRANOSIDE HYDROCHLORIDE

Hydrogenolysis of methyl (4-pentyl - 1 - carbobenzoxy-L)-1-thio by the procedure of Part F–4 gave methyl 6,8-dideoxy - 6 - (4 - pentyl-L-2-pyrrolidinecarboxamide)-1-thio-D-erythro-α-D-galacto-octopyranoside hydrochloride having a melting point of 212–214° C., an optical rotation of $[\alpha]_D+141°$ (c.=0.968, $H_2O$), and the following analysis:

Calcd. for $C_{19}H_{37}N_2O_6SCl$: C, 49.93; H, 8.16; N, 6.13; S, 7.02. Found (corrected for 5.43% $H_2O$): C, 50.22; H, 7.96; N, 6.09; S, 7.18%.

In place of chlorine in the foregoing Examples 8 and 9, there can be substituted bromine with the formation of the corresponding 7-bromo analogs. Also by following the procedure of Example 6, using carbon tetraiodide, the corresponding 7-iodo analogs are obtained. Also, in place of lincomycin D, there can be substituted N-demethyl-N-carbobenzoxylincomycin and analogs thereof prepared as described above. The following example is illustrative.

EXAMPLE 11

PART A–11.—N-DEMETHYL-N-CARBOBENZOXY-LINCOMYCIN

The procedure, Parts B–4 through E–4, was repeated using propyl triphenylphosphonium bromide in place of the butyl triphenylphosphonium bromide. The resulting mixture of cis and trans isomers was chromatographed by the procedure of Part H2–4 to give the trans isomer, N-demethyl - N - carbobenzoxylincomycin, M.P. 176–178° C., $[\alpha]_D+109°$, and the following analysis:

Calcd. for $C_{25}H_{38}N_2O_8S$: C, 57.07; H, 7.27; N, 5.23. Found: C, 56.84; H, 7.28; N, 5.37%.

PART B–11.—7(S)-CHLORO - 7 - DEOXY-N-DEMETHYL-N-CARBOBENZOXYLINCOMYCIN

One gram of N - demethyl-N-carbobenzoxylincomycin was added to a solution of triphenylphosphine dichloride prepared by adding 710 mg. of chlorine to 2.88 g. of triphenylphosphine in 25 ml. of acetonitrile. After 2 hrs., 10 ml. of methanol was added and the solvent evaporated. The residue was chromatographed over 100 g. of silica gel using chloroform-methanol (4:1) for elution. A fraction of 717 mg. was obtained which was a mixture of 7(S) - chloro-7-deoxy-N-demethyl-N-carbobenzoxylincomycin and triphenylphosphine oxide. It was used directly in the next part.

PART C–11.—7(S)-CHLORO-7-DEOXY-N-DEMETHYL-LINCOMYCIN HYDROCHLORIDE

Crude 7(S)-chloro-7-deoxy-N-carbobenzoxylincomycin from above (717 mg.) was dissolved in 25 ml. of methanol and 250 mg. of 10% palladium on charcoal added. The mixture was shaken under 40 lbs. of hydrogen pressure for 2 hrs. The catalyst was removed by filtration and the solvent distilled in vacuo. The residue was purified by chromatography over silica gel (100 g. of silica gel; methanol-chloroform 1:4 for elution) to give 103 mg. of 7(S)-chloro - 7 - deoxy-N-demethyllincomycin hydrochloride. This product was dissolved in acetone and acidified with dilute hydrochlorid acid. Crystalline 7(S)-chloro-7-deoxy-N-demethyllincomycin hydrochloride, melting at 227–229° C. and weighing 95 mg., was obtained. Standard curve, S. lutea assay, indicated antibacterial activity 1.7×7(S)-chloro-7-deoxylinocomycin.

Instead of separating the cis and trans isomers, the mixture can be treated by the procedure of Part B–11 to give methyl 7(S) - chloro - 6,7,8-trideoxy-6-(1-carbobenzoxy-trans- and cis-4-propyl-L-2-pyrrolidinecarboxamido) - 1-thio-L-threo-α-D-galacto-octopyranoside, which on treatment by the procedure of Part C–11 give methyl 7-chloro-6,7,8 - trideoxy-6-(trans- and cis-4-propyl-L-2-pyrrolidine-carboxamido) - 1 - thio-L-threo-α-D-galacto-octopyranoside hydrochloride, M.P. 228–234° C.

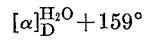

Analysis.—Calcd. for $C_{17}H_{32}Cl_2N_2O_5S$: C, 45.63; H, 7.21; N, 6.26. Found: C, 45.85; 7.51; N, 5.86%. Corrected for 3.91% $H_2O$.

The corresponding S- and 4-analogs and the corresponding 7-bromo and 7-iodo analogs can similarly be prepared.

When the lincomycin in Examples 1, 5, and 6 is replaced by alkyl, cycloalkyl, or aralkyl 6-amino-6,8-dideoxy - 1 - thio-D-erythro-α-D-galacto-octopyranoside there are obtained compounds of the formula

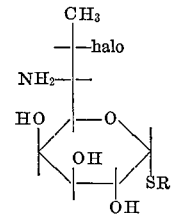

XXIV wherein R is ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl, or any of the isomeric forms thereof; cyclopropyl, cyclobutyl, cyclopentyl, cyclohexyl, cycloheptyl, cyclooctyl, 2-methylcyclopentyl, 2,3-dimethylcyclobutyl, 2-methylcyclobutyl, and 3-cyclopentylpropyl; and benzyl, phenethyl, 3-phenylpropyl, and α-naphthylmethyl which can be acylated by the procedures of Part E–4 to form the corresponding 7-halo-7-deoxylincomycin analogs, for example, the compounds of Formula XXX as given an illustrated above, as well as the intermediates therefor. The following examples are illustrative.

EXAMPLE 12

Methyl 7(S) - chloro - 6,7,8 - trideoxy - 6 - (4 - trans- and cis - propyl -L - 2 - pyrrolidinecarboxamido) - 1 - thio-1-threo-α-D-galacto-octopyranoside

PART A–12.—ACYLATION

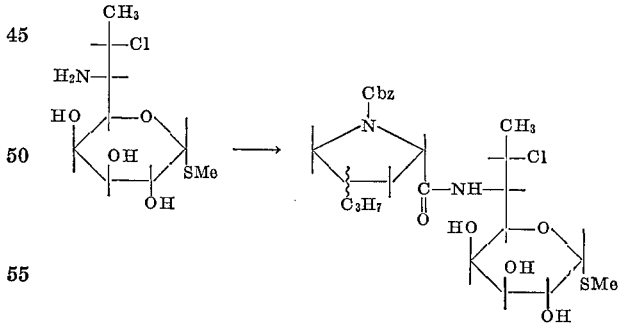

Cis and trans-1-carbobenzoxy-4-propyl-L-proline (2.33 g.) was dissolved in 150 ml. of acetonitrile containing 1.12 ml. of triethylamine. The solution was cooled to 0° and 1.18 ml. of isobutylchloroformate added. After 10 min. at 0°, a solution of 2.17 g. of methyl 7(S)-chloro-7-deoxy-α-thiolincosaminide in 40 ml. of acetonitrile and 40 ml. of water was added. The mixture was stirred for 2 hrs. at ambient temperature and the solvent distilled in vacuo to yield a crystalline residue.

The crystals were collected by filtration, washed, and dried. The yield of methyl N-(1-carbobenzoxy-4-trans and cis-propyl-L-prolyl) - 7(S)-chloro-7-deoxylincosaminide, M.P. 180–183° C., was 3.36 g. A portion was recrystallized several times from ethanol. It melted at 189–192° C.

Analysis.—Calcd. for $C_{25}H_{37}ClN_2O_7S$: C, 55.08; H, 6.84; Cl, 6.51; N, 5.14. Found: C, 54.80; H, 7.15; Cl, 6.59; N, 5.16%.

PART B-12.—HYDROGENALYSIS

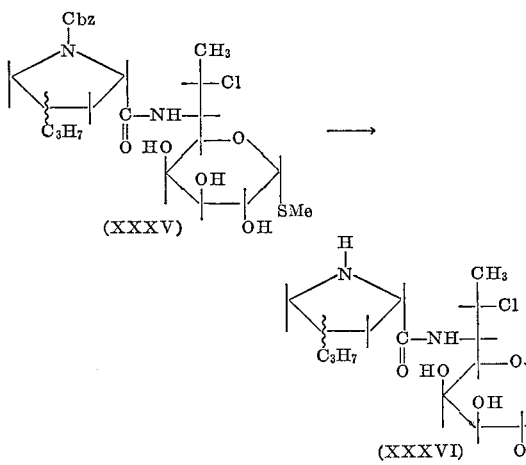

A portion of the crude product from above was dissolved in 50 ml. of methanol and 0.5 g. of 10% palladium on charcoal added. The mixture was shaken under 35 lbs. of hydrogen pressure for 4 hrs. TLC showed partial hydrogenolysis. An additional 0.5 g. of catalyst was added and hydrogenation continued for 18 hrs. The catalyst was removed by filtration. The residue was chromatographed over silica gel, and the more polar fraction collected. It weighed 185 mg. It was converted to the hydrochloride in the usual manner affording 150 mg. of crystals, M.P. 220–222° dec. assaying about 4×lincomycin.

Another portion of the crude product (22.9 g.) was dissolved in 500 ml. of methanol and 6.0 g. of 10% palladium on charcoal added. The mixture was shaken under 35 lbs. of hydrogen pressure for 18 hrs. The catalyst was removed by filtration and the clear liquid phase was evaporated. The solid crude product was converted to the hydrochloride. Crystallization of the crude product from acetone-water afforded 15.08 g. of crystals, M.P. 218–223° dec. Recrystallization from water yielded an analytical sample, M.P. 228–234° dec., $[\alpha]_D + 159°$.

Calculated for $C_{17}H_{32}Cl_2N_2O_5S$: C, 45.63; H, 7.21; N, 6.26. Found: (corrected for 3.91% $H_2O$) C, 45.85; H, 7.51; N, 5.86%.

PART C-12

The methyl 7(S)-chloro-7-deoxy-α-thiolincosaminide was prepared as follows:

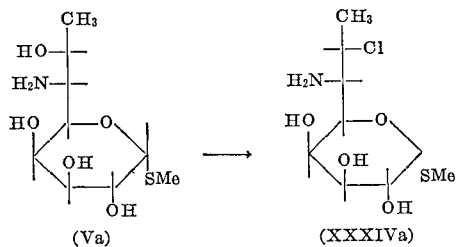

To a suspension of 197.2 g. of triphenylphosphine in 1.5 liter of anhydrous acetonitrile was added 52.5 g. of chlorine. With stirring, 18.75 g. of methyl α-thiolincosaminide (U.S. Patent 3,179,565) was added. After 2.5 hrs. at ambient temperature, 50 ml. of methanol was added. The mixture was concentrated to a thick syrup. The concentrate was diluted with methylene chloride and extracted three times with water. The aqueous extracts were washed twice with methylene chloride. The extracts were made alkaline with sodium hydroxide and extracted repeatedly with methylene chloride. The organic extract was dried and evaporated under vacuum. The residue was chromatographed over 1.1 kg. of silica gel using chloroform-methanol (4:1) for elution. The major fraction selected on the basis if its TLC (thin layer chromatography) profile weighed 4.4 g. Recrystallization from methanol-water afforded 2.73 g. of methyl 7(S)-chloro-7-deoxy-α-thiolincosaminide, M.P. 178–181°.

*Analysis.*—Calcd. for $C_9H_{18}ClNO_4S$: C, 39.77; H, 6.67; N, 5.16; S, 11.80; Cl, 13.05. Found: C, 39.91; H, 7.02; N, 5.57; S, 11.99; Cl, 13.35%.

The cis and trans-1-carbobenzoxy-4-propyl-L-proline of Part A–12 was prepared as follows:

PART D-12.—1 CABOBENZOXY-PROPYLIDENE-L-PROLINE AND DICYCLOHEXYLAMINE SALT

Sodium hydride (3.8 g.) was warmed with 75 ml. of dimethylsulfoxide at a temperature of 70–75° C. until the reaction was complete. After cooling to 20° C. 30.8 g. of propyltriphenylphosphonium bromide was added, and the resulting red solution was stirred for 30 minutes to insure complete reaction. A solution of 5.2 g. of 4-keto-1-carbobenzoxy-L-proline in 15 ml. of dimethyl sulfoxide was added over a period of 15 minutes, and the resulting mixture was stirred for 20 minutes at 26° C. and then at 70° C. for 4 hours. The reaction mixture was cooled, 100 ml. of 5% aqueous potassium bicarbonate and 100 ml. of water added, and filtered. The filtrate was washed twice with 150 ml. portions of ether and the ether was discarded after back extracting with bicarbonate. The bicarbonate solutions were combined, diluted with 200 ml. of water, and acidified with 4 N hydrochloric acid. The acidified mixture was extracted with three 200-ml. portions of ether. The combined ether extracts were washed with three 50-ml. portions of saturated aqueous sodium bisulfite, then with water and dried over anhydrous sodium sulfate. Evaporation of the solvent gave 5.7 g. of a solid residue which was 1-carbobenzoxy-4-propylidene-L-proline.

This residue was dissolved in 18 ml. of acetonitrile and treated with 2.8 ml. of dicyclohexylamine. The crystalline dicyclohexylamine salt, 5.2 g. (55% yield), melted at 154–157° C. After three recrystallizations from acetonitrile, and analytical sample was obtained which melted at 164–166° C. and had a rotation of $[\alpha]_D - 8°$ (c.=0.3898 g./100 ml., $CHCl_3$).

*Analysis.*—Calcd. for $C_{28}H_{42}N_2O_4$: C, 71.45; H, 9.00; N, 5.95. Found: C, 71.77; H, 9.39; N, 5.1%.

PART E-12.—CIS AND TRANS-1-CARBOBENZOXY-4-PROPYL-L-PROLINE

Ten grams of the amine salt of Part D–12 was shaken with ether and 2% potassium hydroxide. The aqueous layer was separated and acidified. Extraction with methylene chloride led to the isolation of 6 g. of oily acid. A mixture of 2 g. of this oil and 800 mg. of 7% platinum on Dowex–1 catalyst (10) in 50 ml. of methanol was shaken under 40 lbs. of hydrogen pressure for 17 hrs. The catalyst was removed by filtration and the solvent distilled in vacuo, leaving a residue of 2 g. of oil. Thin layer chromatography, using a methanol-5% ammonium hydroxide system and permanganate-periodate indicator spray indicated that the double bond was hydrogenated. Ninhydrin gave a negative test. This product resisted crystallization and was used without purification in Part A–12.

EXAMPLE 13

*Methyl 7-chloro-6,7,8-trideoxy-6-(cis- and trans-4-hexyl-L-2-pyrrolidinecarboxamido)-1-thio-L-threo-α-D-galacto-octopyranoside*

Following the procedure of Example 12 substituting the propyltriphenylphosphonium bromide of Part D by hexyltriphenylphosphonium bromide, there is obtained N-carbobenzoxy-4-hexylidene-L-proline dicyclohexylamine salt, M.P. 115–119° C.; N-carbobenzoxy-4-cis and trans-hexyl-L-proline as an oil; methyl 7-chloro-6,7,8-trideoxy-6-(1-carbobenzoxy-4-cis- and trans-hexyl-L-2-pyrrolidine-carboxamido)-1-thio-L-threo-α-D-galacto-octopyranoside, M.P. 185–187° C.; and methyl 7-chloro-6,7,8-trideoxy-6-(4-cis and trans-hexyl - L - 2 - pyrrolidinecarboxamido)-1-thio - L - threo - α - D - galacto-octopyranoside, M.P. 212–215° C. (dec.)

EXAMPLE 14

Following the procedure of Example 12 substituting the 1-carbobenzoxy-4-propyl-L-proline of Part A by 1-carbobenzoxy-L-proline there are obtained methyl N-(1-carbobenzoxy - L - prolyl) - 7(S)-chloro-7-deoxylincosaminide, M.P. 170–171° C.,

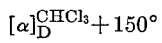

*Analysis.*—Calcd. for $C_{21}H_{31}ClN_2O_7S$: C, 52.53; H, 6.21; N, 5.57; S, 6.38; Cl, 7.05. Found: C, 52.57; H, 5.11; N, 5.73; S, 6.96; Cl, 6.87%.

And methyl N-(L-prolyl)-7(S)-chloro-7-deoxylincosaminide hydrochloride,

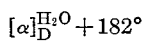

*Analysis.*—Calcd. for $C_{14}H_{26}Cl_2N_2O_5S$: C, 41.48; H, 6.46; N, 6.91; S, 7.91; Cl, 17.49. Found: C, 41.74; H, 7.81; N, 7.05; S, 8.04; Cl, 17.36%.

By substituting the lincomycin by 7-epilincomycin, there is obtained methyl 7-chloro-, 7-bromo-, and 7-iodo-6,7,8,-trideoxy-6-(trans-1-methyl-4-propyl-L-2-pyrrolidinecarboxamido)- 1 - thio-D-erythro-α-D-galacto-octopyranoside (7(R)-halo-7-deoxylincomycin) which has the same antibacterial spectrum as lincomycin. The following Example is illustrative.

EXAMPLE 15

PART A–15

Following the procedure of Example 12 substituting the methyl α-thiolincosaminide by methyl 7-epi-α-thiolincosaminide (methyl 6-amino-6,8 - dideoxy - 1 - thio - L - threo-α-D-galacto-octopyranoside) there is obtained 7(R)-chloro-7-deoxy-epilincomycin D (methyl 7-chloro-6,7,8-trideoxy-6-(trans-4-propyl-L-2 - pyrrolidinecarboxamido)-1-thio-D-erythro-α-D-galacto-octopyranoside) and the cis isomer thereof.

The methyl epi-α-thiolincosaminide is obtained by the hydrazinolysis by the process of U.S. Patent 3,179,595 of 7-epilincomycin which is prepared as follows:

PART B–15.—3,4-O-ISOPROPYLIDENELINCOMYCIN

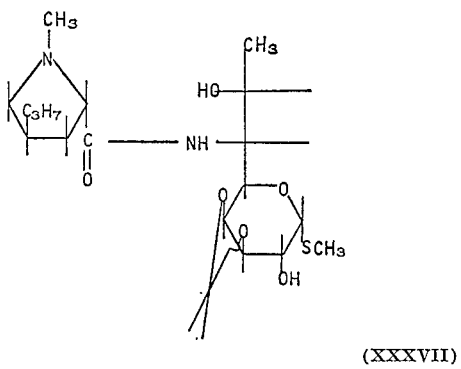

(XXXVII)

A solution of 9.8 g. of lincomycin in 150 ml. of acetone is added to a solution of 9.8 g. of p-toluenesulfonic acid monohydrate in 100 ml. of acetone with good stirring and avoidance of exposure to moisture. The mixture is stirred at ambient temperature for 1 hour, after which 100 ml. of anhydrous ether is added and stirring is continued in an ice-bath for 0.5 hour. The mixture is filtered and the solid is dried in vacuo at 50° C.; yield 13.35 g. (85.5%) of 3,4 - O - isopropylidenelincomycin p-toluenesulfonate. An additional 1.15 g. (7.4%) can be recovered from the mother liquors by adding 350 ml. of anhydrous ether to the mother liquor from the previous filtering operation and chilling the solution for 1 hour. The 14.5 g. so obtained are suspended in 200 ml. of ether and shaken vigorously with 125 ml. of 5% potassium bicarbonate solution. The aqueous layer is back-extracted with two 100-ml. portions of ether. The ether extracts are washed with 50 ml. of saturated sodium chloride solution and then filtered through anhydrous sodium sulfate. The ether is evaporated under vacuum, leaving 7.9 g. (73.1%) of 3,4-O-isopropylidenelincomycin which is dissolved in 25 ml. of ether acetate and concentrated to about 10 to 15 ml. The concentrate is allowed to stand at room temperature for several hours and then refrigerated overnight. The crystals are filtered from the solution and washed sparingly with cold ethyl acetate; yield 4.55 g. (42.2%) of 3,4-O-isopropylidenelincomycin having a melting point of 126–128° C., and an optical rotation of $[\alpha]_D^{25}$ 101–102° (c., 1, methylene chloride).

PART C–15.—7-DEHYDRO-3,4-O-ISOPROYLIDENELINCOMYCIN

To a solution of 6 g. (0.0135 mole) of isopropylidenelincomycin in 75 ml. of pyridine was added 12 g. (excess) chromic oxide. The solution warms up about 20° C. After one hour the mixture was added to a solution containing 150 ml. each of ethyl ether and ethyl acetate. This was then filtered and evaporated to a syrup, 8.4 g. This syrup was distributed in a 500-transfer countercurrent distribution using the system, water-ethyl acetate:ethanol:cyclohexane (1:1:1:1). 7-dehydro-3,4-isopropylidenelincomycin was isolated as the peak fraction from tubes 330–380, K=2.45.

*Analysis.*—Calcd. for $C_{31}H_{36}N_2O_6S$: C, 56.72; H, 8.16; N, 6.30; S, 7.21. Found: C, 56.37; H, 7.62; N, 6.51; S, 6.84%.

PART D–15.—3,4-O-ISOPROPYLIDENE-7-EPILINCOMYCIN

To 1.6 g. of Craig-pure 7-dehydro-3,4-O-isopropylidenelincomycin in 75 ml. of methanol was added 400 mg. of sodium borohydride. After 1.5 hrs. this solution was evaporated to dryness on a rotary evaporator. The residue was added to 25 ml. of water and extracted three times with 25 ml. of methylene chloride. The extract was back-washed with 15 ml. of water, then dried over magnesium chloride and evaporated to dryness. The residue, 1.4 g., was distributed in a 500-transfer countercurrent distribution using the solvent system, water:ethyl acetate: ethanol:cyclohexane (1:1:1:1), and a single peak which fit the theoretical was observed at K=1.05. The material in tubes 240 to 280 was isolated as a syrup.

*Analysis.*—Calcd. for $C_{21}H_{38}N_2O_6S$: C, 56.47; H, 8.58; N, 6.27; S, 7.18. Found: C, 56.24; H, 8.54; N, 6.13; S, 7.01%.

Thin layer chromatography (TLC) showed that this material consisted of two substances. One was 3,4-O-isopropylidenelincomycin; the other 3,4-O-isopropylidene-7-epilincomycin, which moved slightly slower.

PART E–15.—7-EPILINCOMYCIN

The syrup from Part D–15 was stored at room temperature 5 hrs. in a solution containing 60 ml. of 0.25 N hydrochloric acid and 40 ml. of ethanol. It was then kept at 0° C. for 4 days. Following neutralization with sodium bicarbonate, it was evaporated to 25 ml., then extracted with chloroform. The extract was washed with a little water and dried over magnesium sulfate, then evaporated to a residue. Thin layer chromatography of the residue showed two substances, both of which were active against *S. lutea*. The residue was chromatographed on a 14" x ¾" Florisil (a synthetic silicate of the type described in U.S. Patent 2,393,625) column which was eluted gradiently with solvent which varied continuously from 100% Skellysolve B (technical hexane) to 100% acetone. The total volume was 5000 ml. The two compounds were thus separated:

Fraction I: Tubes 53–65 (40 ml. cuts), 7-epilincomycin. Assay 450 mcg./ml.

*Analysis.*—Calcd. for $C_{18}H_{34}N_2O_6S$: C, 50.92; H, 8.55; N, 6.60; S, 7.56. Found: C, 50.19; H, 7.91; N, 6.05; S, 6.42%.

Fraction II: Tubes 73–104, lincomycin. Assay 950 mcg./mg.

EXAMPLE 16

*7(R)-bromo-7-deoxylincomycin*

The procedure of Example 5 substituting the lincomycin by 7-epilincomycin yields 7(R)-bromo-7-deoxylincomycin of the formula

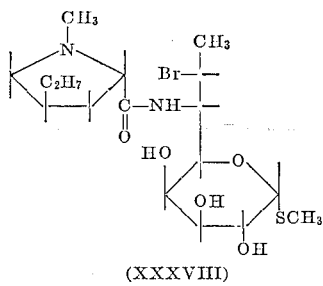

(XXXVIII)

as the free base and as the hydrochloride.

By substituting lincomycin in Example 15 by lincomycin analogs of Formula II wherein Z, R, $R_1$, $R_2$, $R_3$ of the Ac group are as given and illustrated above, or by substituting in Example 16 the 7-epilincomycin by the 7-epilincomycin analogs thus obtained, the corresponding 7(R)-halo-7-deoxylincomycin analogs of the formula

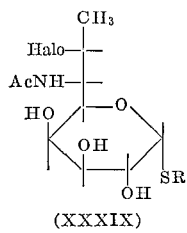

(XXXIX)

where R, and Ac are as given above, are obtained. All the compounds that have been described above, therefore, have their counterpart in the opposite configuration, that is configuration derived from the 7-epi form. As an inversion is effected by the substitution of the 7-hydroxy, the 7-epi-compounds, which have the L-threo configuration, are converted to the D-erythro configuration. Thus both the D-erythro and L-threo forms are obtained depending on whether the normal lincomycins (D-erythro) or the 7-epi-lincomycins (L-threo) are used.

EXAMPLE 17

*7(S)-chloro-7-deoxy-N-ethyl lincomycin D*

Following the procedure of Part H1-4 and Part H2-4, substituting the methyl 6,8-dideoxy-6-(4-butyl-L-2-pyrrolidine - carboxamido - 1 - thio - D - erythro - α - D - galacto-octapyranoside hydrochloride by lincomycin D (N-desmethyllincomycin) hydrochloride, there is obtained 7(S)-chloro-7-deoxy-N-ethyllincomycin D hydrochloride, $$[\alpha]_D^{H_2O} + 133°$$

*Analysis.*—Calcd. for $C_{19}H_{36}Cl_2N_2O_5S$: C, 47.99; H, 7.63; N, 5.89; S, 6.74; Cl, 14.91. Found: C, 48.20; H, 7.81; N, 6.07; S, 6.48; Cl, 15.05%. Corrected for 4.57% $H_2O$.

EXAMPLE 18

*7(R)-chloro-7-deoxylincomycin*

Following the procedure of Example 8, substituting the lincomycin D hydrochloride by 7-epilincomycin hydrochloride there is obtained 7(R)-chloro-7-deoxylincomycin hydrochloride, $$[\alpha]_D^{H_2O} + 122°$$

*Analysis.*—Calcd. for $C_{18}H_{34}Cl_2N_2O_5S$: C, 46.85; H, 7.43; N, 6.07; S, 6.95; Cl, 15.37. Found: C, 46.65; H, 7.62; N, 6.23; S, 6.80; Cl, 15.35%. Corrected for 4.06% $H_2O$.

EXAMPLE 19

*7(S)-chloro-7-deoxylincomycin B*

Following the procedure of Example 8 substituting the lincomycin D hydrochloride by lincomycin B hydrochloride, there is obtained 7(S)-chloro-7-deoxylincomycin B hydrochloride, $$[\alpha]_D^{H_2O} + 149°$$

*Analysis.*—Calcd. for $C_{17}H_{32}Cl_2N_2O_5S$: C, 45.63; H, 7.21; N, 6.26; S, 7.18; Cl, 15.85. Found: C, 45.25; H, 6.62; N, 5.95; S, 7.10; Cl, 16.45%. Corrected for 7.90% $H_2O$.

EXAMPLE 20

Following the procedure of Example 4, substituting the butyl triphenylphosphonium bromide by pentyl triphenylphosphonium bromide, there is obtained methyl 7-chloro-6,7,8 - trideoxy - 6 - (1 - methyl - trans - 4 - pentyl - L - 2 - pyrrolidinecarboxamido) - 1 - thio - L - threo - α - D - galacto-octopyranoside hydrochloride, $$[\alpha]_D^{H_2O} + 125°$$

*Analysis.*—Calcd. for $C_{20}H_{38}Cl_2N_2O_5S$: C, 47.33; H, 7.98; N, 5.52; S, 6.70; Cl, 14.82. Found: C, 46.73; H, 8.00; N, 5.34; S, 6.26; Cl, 13.91%. Corrected for 3.55% $H_2O$.

And methyl 7-chloro-6,7,8-trideoxy-6-(1-ethyl)-trans-4-pentyl - L - 2 - pyrrolidenecarboxamido) - 1 - thio - L - threo-α-D-galacto-octopyranoside hydrochloride and the cis isomer thereof.

EXAMPLE 21

Following the procedure of Example 10, substituting the pentyl triphenylphosphonium bromide by octyl triphenylphosphonium bromide, there is obtained methyl 7-chloro-6,7,8-trideoxy-6-(trans- and cis-4-octyl-L-2-pyrrolidinecarboxamido) - 1 - thio - L - threo - α - D - galacto-octapyranoside hydrochloride, M.P. 201–203° C.

EXAMPLE 22

Following the procedure of Example 8 substituting the lincomycin D hydrochloride by lincomycin C hydrochloride, there is obtain 7(S)-chloro-7-deoxylincomycin C hydrochloride, $$[\alpha]_D^{H_2O} + 136°$$

*Analysis.*—Calcd. for $C_{19}H_{36}Cl_2N_2O_5S$: C, 47.99; H, 7.63; N, 5.89; S, 6.74; Cl, 14.91. Found: C, 43.95; H, 7.81; N, 5.41; S, 6.48; Cl, 14.74%.

EXAMPLE 23

Following the procedure of Example 4, substituting the butyl triphenylphosphonium bromide by hexyl triphenylphosphonium, bromide, there are obtained methyl 7-chloro - 6,7,8 - trideoxy - 6 - (trans - 1 - ethyl - 4 - hexyl - L - 2 pyrrolidinercarboxamido) - 1 - thio - L - threo - α - D-galacto-octopyranoside hydrochloride, $$[\alpha]_D^{H_2O} + 124°$$

*Analysis.*—Calcd. for $C_{22}H_{42}Cl_2N_2O_5S$: C, 51.05; H, 8.18; N, 5.41; S, 6.20; Cl, 13.70. Found: C, 50.85; H, 7.26; N, 5.47; S, 6.79; Cl, 13.43%. Corrected for 3.38% $H_2O$.

And the corresponding cis isomer and methyl 7-chloro-6,7,8 - trideoxy - 6 - (trans - 1 - methyl - 4 - hexyl - L - 2 - pyrrolidinecarboxamido) - 1 - thio - L - threo - α - D-galacto-octopyranoside hydrochloride, $$[\alpha]_D^{H_2O} + 125°$$

*Analysis.*—Calcd. for $C_{21}H_{40}Cl_2N_2O_5S$: C, 47.33; H, 7.94; N, 5.52; S, 6.32; Cl, 13.97. Found: C, 46.73; H, 8.00; N, 5.34; S, 6.26; Cl, 13.91%. Corrected for 3.84% $H_2O$.

And the cis isomer thereof.

EXAMPLE 24

Following the procedure of Example 10 substituting the pentyl triphenylphosphonium bromide by hexyl triphenylphosphonium bromide, there is obtained methyl 7-chloro-6,7,8 - trideoxy - 6 - (trans and cis - 4 - hexyl - L - 2 - pyrrolidinecarboxamido) - 1 - thio - L - threo - α - D - galacto-octopyranoside hydrochloride, M.P. 219–221° C.

*Analysis.*—Calcd. for $C_{20}H_{38}Cl_2N_2O_5S$: C, 49.07; H, 7.82; N, 5.72; S, 6.55; Cl, 14.49. Found: C, 49.07; H, 7.64; N, 5.32; S, 6.51; Cl, 14.43%.

EXAMPLE 25

Following the procedure of Example 10 substituting the pentyl triphenylphosphonium bromide by ethyl triphenylphosphonium bromide there is obtained methyl 7-cholor-6,7,8 - trideoxy - 6 - (trans- and cis - 4 - ethyl - L - 2 - pyrrolidinecarboxamido) - 1 - thio - L - threo - α - D - galacto-octopyranoside hydrochloride, M.P. 240–242° C.

*Analysis.*—Calcd. for $C_{16}H_{30}Cl_2N_2O_5S$: C, 44.33; H, 6.98; N, 6.47; S, 7.48. Found: C, 44.21; H, 7.25; N, 6.08; S, 7.26%.

EXAMPLE 26

Following the procedure of Example 4, substituting the butyl triphenylphosphonium bromide by pentyl triphenylphosphonium bromide, and acetone for formaldehyde, there is obtained methyl 7-cholor-6,7,8-trideoxy-6 - (1 - isopropyl - 4 - pentyl - L - 2 - pyrrolidinecarboxamido) - 1 - threo - L - threo - α - D - galacto - octopyranoside hydrochloride, M.P. 77–80° C.

While the processes of the invention have been described with reference to the preparation of specific compounds, it is to be understood that the process is broadly applicable to compounds of Formula II wherein Ac and R are radicals which are not reactive with the halogenating reagent. Thus, in the broad process according to the invention, Ac can be hydrogen or any acyl that is non-reactive with the halogenating reagent and R can be any alkyl, irrespective of the number of carbons, or any other radical, for example, aralkyl like benzyl, napthylmethyl, and benzhydryl, or like hydrocarbon radicals that are non-reactive with the halogenating reagent.

We claim:

1. A compound of the formula

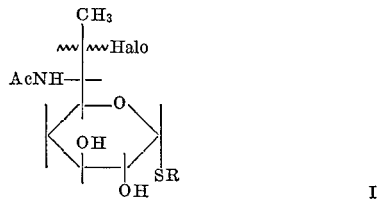

and the salts thereof wherein Halo is chlorine, bromine, or iodine; R is alkyl of not more than 20 carbon atoms, cycloalkyl of from 3 to not more than 8 carbon atoms, or aralkyl of not more than 12 carbon atoms; Ac is the acyl radical of a 4-substituted-L-2-pyrrolidinecarboxylic acid of the formula

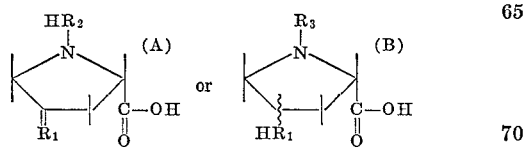

wherein $R_1$ and $R_2$ are alkylidene of not more than 20 carbon atoms, cycloalkylidene of from 3 to not more than 8 carbon atoms, or aralkylidene of not more than 12 carbon atoms; and $R_3$ is hydrogen or $HR_2$.

2. A compound and the salts thereof according to claim 1 having the formula

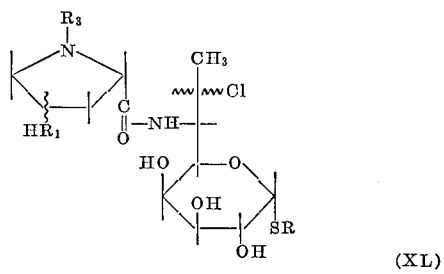

wherein $HR_1$ and R are lower alkyl and $R_3$ is hydrogen or lower alkyl.

3. A compound and the salts thereof according to claim 2 wherein R is methyl or ethyl, $HR_1$ is alkyl of not more than eight carbon atoms, and $R_3$ is hydrogen, methyl, or ethyl.

4. A compound and the salts thereof according to claim 2 wherein R is methyl or ethyl, $HR_1$ is propyl, and $R_3$ is hydrogen, methyl, or ethyl.

5. A compound and the salts thereof according to claim 2 wherein R is methyl or ethyl, $HR_1$ is pentyl, and $R_3$ is hydrogen, methyl, or ethyl.

6. A compound and the salts thereof according to claim 2 wherein R is methyl or ethyl, $HR_1$ is hexyl, and $R_3$ is hydrogen, methyl, or ethyl.

7. A compound and the salts thereof according to claim 1 having the formula

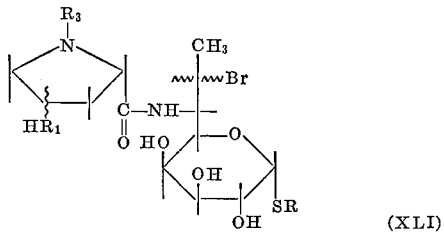

wherein $HR_1$ and R are lower alkyl and $R_3$ is hydrogen or lower alkyl.

8. A compound and the salts thereof according to claim 7 wherein R is methyl or ethyl, $HR_1$ is alkyl of not more than eight carbon atoms, and $R_3$ is hydrogen, methyl, or ethyl.

9. A compound and the salts thereof according to claim 7 wherein R is methyl or ethyl, $HR_1$ is propyl, and $R_3$ is hydrogen, methyl, or ethyl.

10. A compound and the salts thereof according to claim 7 wherein R is methyl or ethyl, $HR_1$ is pentyl, and $R_3$ is hydrogen, methyl, or ethyl.

11. A compound and the salts thereof according to claim 7 wherein R is methyl or ethyl, $HR_1$ is hexyl, and $R_3$ is hydrogen, methyl, or ethyl.

12. A compound and the salts thereof according to claim 1 having the formula

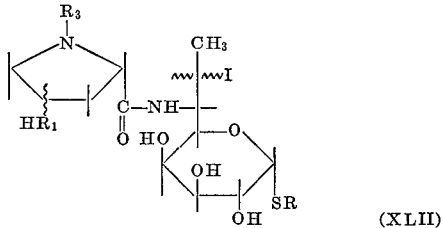

wherein $HR_1$ and R are lower alkyl and $R_3$ is hydrogen or lower alkyl.

13. A compound and the salts thereof according to claim 12 wherein R is methyl or ethyl, $HR_1$ is alkyl of not more than eight carbon atoms, and $R_3$ is hydrogen, methyl, or ethyl.

14. A compound and the salts thereof according to claim 12 wherein R is methyl or ethyl, HR₁ is propyl, and R₃ is hydrogen, methyl, or ethyl.

15. A compound and the salts thereof according to claim 12 wherein R is methyl or ethyl, HR₁ is pentyl, and R₃ is hydrogen, methyl, or ethyl.

16. A compound and the salts thereof according to claim 12 wherein R is methyl or ethyl, HR₁ is hexyl, and R₃ is hydrogen, methyl or ethyl.

17. A compound and the salts thereof according to claim 1 having the formula

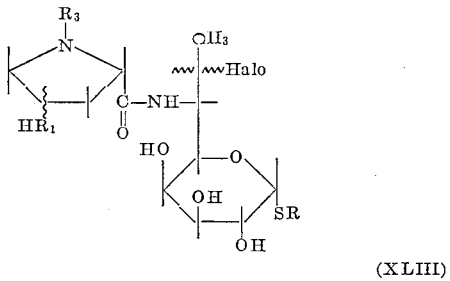

(XLIII)

wherein Halo is chlorine, bromine, or iodine; R and R₃ are lower alkyl and HR₁ is cycloalkyl of from 3 to not more than 8 carbon atoms.

18. A compound and the salts thereof according to claim 17 in which HR₁ is cyclohexyl.

19. 7(S)-chloro-7-deoxylincomycin hydrochloride, the hydrochloride of a compound according to claim 2 wherein R and R₃ are methyl, HR₁ is trans-propyl and the configuration is L-threo.

20. Methyl 7-chloro-6,7,8-trideoxy-6-(1-ethyl-4-propyl-L-2-pyrrolidinecarboxamido)-1-thio-L-threo-α-D-galacto - octopyranoside hydrochloride, the hydrochloride of a compound according to claim 2 wherein R is methyl, R₃ is ethyl, HR₁ is propyl, and the configuration is L-threo.

21. Methyl 7-chloro-6-7,8-trideoxy-6-(1-ethyl-4-butyl-L-2-pyrrolidinecarboxamido)-1-thio-L-threo-α-D-galacto - octopyranoside, hydrochloride, the hydrochloride of a compound according to claim 2 wherein R is methyl, R₃ is ethyl, HR₁ is butyl, and the configuration is L-threo.

22. Methyl 7-chloro-6,7,8-trideoxy-6-(1-methyl-4-butyl-L-2-pyrrolidinecarboxamido)-1-thio-L-threo-α-D-galacto - octopyranoside, hydrochloride, the hydrochloride of a compound according to claim 2 wherein R and R₃ are methyl, HR₁ is butyl, and the configuration is L-threo.

23. Methyl 7 - chloro - 6,7,8 - trideoxy-6-(1-methyl-4-pentyl - L-2-pyrrolidinecarboxamido)-1-thio-L-threo-α-D-galacto-octopyranoside hydrochloride, the hydrochloride of a compound according to claim 2 wherein R and R₃ are methyl, HR₁ is pentyl, and the configuration is L-threo.

24. Methyl 7-chloro-6-7,8-trideoxy-6-(1-ethyl-4-pentyl-L-2-pyrrolidinecarboxamido)-1-thio-L-threo-α-D-galacto - octopyranoside hydrochloride, the hydrochloride of a compound according to claim 2 wherein R is methyl, R₃ is ethyl, HR₁ is pentyl, and the configuration is L-threo.

25. Methyl 7 - chloro - 6-7,8-trideoxy-6-(4-propyl-L-2-pyrrolidinecarboxamido) - 1 - thio-L-threo-α-D-galacto-octopyranoside hydrochloride, the hydrochloride of a compound according to claim 2 wherein R is methyl, R₃ is hydrogen, HR₁ is propyl, and the configuration is L-threo.

26. Methyl 7-chloro-6,7,8-trideoxy-6-(4-butyl-L-2-pyrrolidinecarboxamido) - 1 - thio - L - threo-α-D-galacto-octopyranoside hydrochloride, the hydrochloride of a compound according to claim 2 wherein R is methyl, R₃ is hydrogen, HR₁ is butyl, and the configuration is L-threo.

27. Methyl 7-chloro-6,7,8-trideoxy-6-(4-pentyl-L-2-pyrrolidinecarboxamido) - 1 - thio - L - threo-α-D-galacto-octopyranoside hydrochloride, the hydrochloride of a compound according to claim 2 wherein R is methyl, R₃ is hydrogen, HR₁ is pentyl, and the confifuration is L-threo.

28. Methyl 7-chloro-6,7,8-trideoxy-6-(4-hexyl-L-2-pyrrolidinecarboxamido) - 1 - thio - L - threo-α-D-galacto-octopyranoside hydrochloride, the hydrochloride of a compound according to claim 2 wherein R is methyl, R₃ is hydrogen, HR₁ is hexyl, and the configuration is L-threo.

29. 7(S)-bromo-7-deoxylincomycin hydrobromide, the hydrobromide of a compound according to claim 7 wherein R and R₃ are methyl, HR₁ is trans-propyl, and the configuration is L-threo.

30. Methyl 7-bromo-6,7,8-trideoxy-6-(1-ethyl-4-propyl-L-2-pyrrolidinecarboxamido)-1-thio-L-threo-α-D-galacto - octopyranoside hydrobromide, the hydrobromide of a compound according to claim 7 wherein R is methyl, R₃ is ethyl, HR₁ is propyl, and the configuration is L-threo.

31. Methyl 7-bromo-6,7,8-trideoxy-6-(1-ethyl-4-butyl-L-2-pyrrolidinecarboxamido)-1-thio-L-threo-α-D-galacto - octopyranoside hydrobromide, the hydrobromide of a compound according to claim 7 wherein R is methyl, R₃ is ethyl, HR₁ is butyl, and the configuration is L-threo.

32. Methyl 7 - bromo - 6,7,8 - trideoxy-6-(1-methyl-4-butyl - L - 2 - pyrrolidinecarboxamido)-1-thio-L-threo-α-D-galacto-octopyranoside hydrobromide, the hydrobromide of a compound according to claim 7 wherein R and R₃ are methyl, HR₁ is butyl, and the configuration is L-threo.

33. Methyl 7 - bromo - 6,7,8 - trideoxy-6-(1-methyl-4-pentyl - L-2-pyrrolidinecarboxamido)-1-thio-L-threo-α-D-galacto-octopyranoside hydrobromide, the hydrobromide of a compound according to claim 7 wherein R and R₃ are methyl, HR₁ is pentyl, and the configuration is L-threo.

34. Mehtyl 7-bromo-6,7,8-trideoxy-6-(1-ethyl-4-pentyl-L-2-pyrrolidinecarboxamido)-1-thio-L-threo-α-D-galacto - octopyranoside hydrobromide, the hydrobromide of a compound according to claim 7 wherein R is methyl, R₃ is ethyl, HR₁ is pentyl, and the configuration is L-threo.

35. Methyl 7 - bromo-6,7,8-trideoxy-6-(4-propyl-L-2-pyrrolidinecarboxamido) - 1 - thio - L-threo-α-D-galacto-octopyranoside hydrobromide, the hydrobromide of a compound according to claim 7 wherein R is methyl, R₃ is hydrogen, HR₁ is propyl, and the configuration is L-threo.

36. Methyl 7 - bromo - 6,7,8 - trideoxy-6-(4-butyl-L-2-pyrrolidinecarboxamido) - 1 - thio - L-threo-α-D-galacto-octopyranoside hydrobromide, the hydrobromide of a compound according to claim 7 wherein R is methyl, R₃ is hydrogen, HR₁ is butyl, and the configuration is L-threo.

37. Methyl 7 - bromo - 6,7,8 - trideoxy-6-(4-pentyl-L-2 - pyrrolidinecarboxamido) - 1-thio-L-threo-α-D-galacto-octopyranoside hydrobromide, the hydrobromide of a compound according to claim 7 wherein R is methyl, R₃ is hydrogen, HR₁ is pentyl, and the configuration is L-threo.

38. Methyl 7 - bromo - 6,7,8 - trideoxy-6-(4-hexyl-L-2-pyrrolidinecarboxamido) - 1 - thio - L-threo-α-D-galacto-octopyranoside hydrobromide, the hydrobromide of a compound according to claim 7 wherein R is methyl, R₃ is hydrogen, HR₁ is hexyl, and the configuration is L-threo.

39. 7(S) - iodo-7-deoxylincomycin hydrochloride, the hydrochloride of a compound according to claim 12 wherein R and R₃ are methyl, HR₁ is trans-propyl, and the configuration is L-threo.

40. Methyl 7-iodo-6,7,8-trideoxy-6-(1-ethyl-4-propyl-L-2 - pyrrolidinecarboxamido) - 1-thio-L-threo-α-D-galacto-octopyranoside hydrochloride, the hydrochloride of a compound according to claim 12 wherein R is methyl, R₃ is ethyl, HR₁ is propyl, and the configuration is L-threo.

41. Methyl 7 - iodo-6,7,8-trideoxy-6-(4-propyl-L-2-pyrrolidinecarboxamido) - 1 - thio - L-threo-α-D-gelacto-octopyranoside hydrochloride, the hydrochloride of a compound according to claim 12 wherein R is methyl, $R_3$ is hydrogen, $HR_1$ is propyl, and the configuration is L-threo.

42. Methyl 7 - iodo-6,7,8-trideoxy-6-(4-pentyl-L-2-pyrrolidinecarboxamido)-1-thio-L-threo-α-D - galacto - octopyranoside hydrochloride, the hydrochloride of a compound according to claim 12 wherein R is methyl, $R_3$ is hydrogen, $HR_1$ is pentyl, and the configuration is L-threo.

43. A compound of the formula

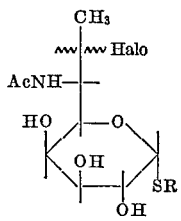

wherein Halo is chlorine, bromine, or iodine; R is alkyl of not more than 20 carbon atoms, cycloalkyl of from 3 to not more than 8 carbon atoms, and aralkyl of not more than 12 carbon atoms; Ac is the acyl radical of a 4-substituted-L-2-pyrrolidinecarboxylic acid of the formula

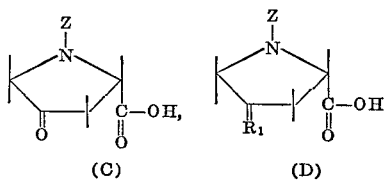

or

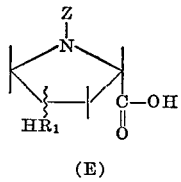

wherein $R_1$ and $R_2$ are alkylidene of not more than 20 carbon atoms, cycloalkylidene of from 3 to not more than 8 carbon atoms and aralkylidene of not more than 12 carbon atoms; and Z is a protective group removable by hydrogenolysis or solvolysis selected from the group consisting of trityl, diphenyl(p-methoxyphenyl)methyl, bis-(p-methoxyphenyl)phenylmethyl, benzyl, p-nitrobenzyl, and hydrocarbyloxycarbonyl groups.

44. A compound according to claim 43 having the formula

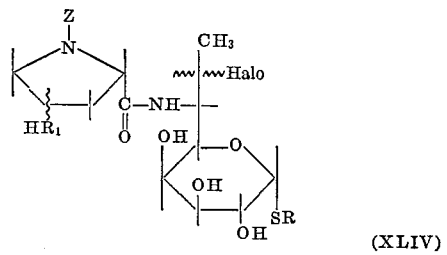

(XLIV)

wherein R and $HR_1$ are alkyl of not more than 20 carbon atoms, cycloalkyl of from 3 to not more than 8 carbon atoms, or aralkyl of not more than 12 carbon atoms; Halo is chlorine, bromine, or iodine; and Z is hydrocarbyloxycarbonyl, trityl, diphenyl(p-methoxyphenyl)methyl, bis-(p-methoxyphenyl)-phenylmethyl, benzyl, or nitrobenzyl.

45. The process of making compounds of the formula

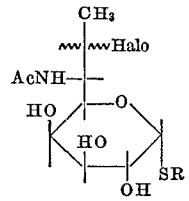

and the esters and ethers thereof wherein Halo is chlorine or bromine, Ac is hydrogen or an acyl radical of an L-2-pyrrolidinecarboxylic acid, and R is the radical of a mercaptan, the step of reacting a compound of the formula

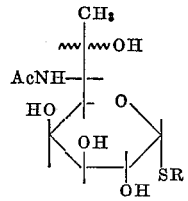

or an ester or ether thereof having a free 7-hydroxy group with Rydon reagent at a temperature effective to replace the 7-hydroxy group with halogen.

46. A process according to claim 45 wherein R is alkyl and Ac is hydrogen.

47. A process according to claim 45 wherein R is alkyl of not more than 20 carbon atoms and Ac is the acyl radical of a 4-substituted-L-2-pyrrolidinecarboxylic acid of the formula

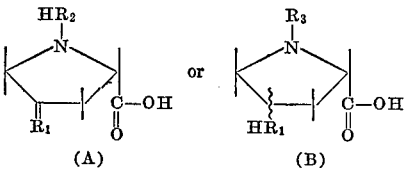

wherein $R_1$ and $R_2$ are alkylidene of not more than 20 carbon atoms, cycloalkylidene of from 3 to not more than 8 carbon atoms or aralkylidene of not more than 12 carbon atoms; and $R_3$ is hydrogen or $HR_2$.

48. A process according to claim 45 wherein R is alkyl of not more than 20 carbon atoms and Ac is the acyl radical of a 4-substituted-L-2-pyrrolidinecarboxylic acid of the formula

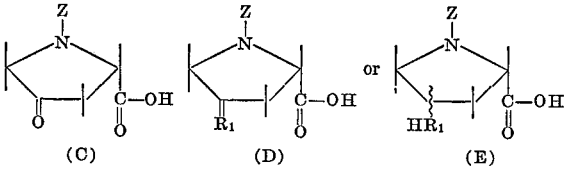

wherein $R_1$ and $R_2$ are selected from the group consisting of alkylidene of not more than 20 carbon atoms, cycloalkylidene of from 3 to not more than 8 carbon atoms, and aralkylidene of not more than 12 carbon atoms; and Z is a protective group removable by hydrogenolysis or solvolysis selected from the group consisting of trityl, diphenyl(p-methoxyphenyl)methyl, bis-(p-methoxyphenyl)phenylmethyl, benzyl, p-nitrobenzyl, and hydrocarbyloxycarbonyl groups.

49. A compound of the formula

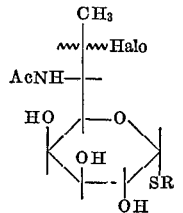

and the salts thereof wherein Halo is chlorine, bromine, or iodine; R is alkyl of not more than 20 carbon atoms, cycloalkyl of from 3 to not more than 8 carbon atoms, or aralkyl of not more than 12 carbon atoms; Ac is the acyl radical of an L-pyrrolidinecarboxylic acid of the formula

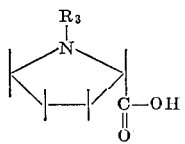

wherein $R_3$ is hydrogen or carbobenzoxy.

50. Methyl N - (L-prolyl) - 7(S) - chloro-7-deoxylincosaminide hydrochloride, a compound according to claim 49 wherein R is methyl, X is chlorine, and Ac is L-prolyl.

51. A compound according to claim 49 wherein $R_3$ is carbobenzoxy.

References Cited

UNITED STATES PATENTS

| | | | |
|---|---|---|---|
| 3,208,996 | 9/1965 | Hoeksema | 260—210 |
| 3,380,992 | 4/1968 | Argoudelis et al. | 260—210 |
| 3,418,414 | 12/1968 | Houtman | 260—210 |
| 3,435,025 | 3/1969 | Birkenmeyer | 260—210 |

LEWIS GOTTS, Primary Examiner

J. R. BROWN, Assistant Examiner

U.S. Cl. X.R.

195—80; 252—356; 260—326.3, 999

UNITED STATES PATENT OFFICE
CERTIFICATE OF CORRECTION

Patent No. 3,496,163                    Dated February 17, 1970

Inventor(s) Robert D. Birkenmeyer and Fred Kagan

It is certified that error appears in the above-identified patent and that said Letters Patent are hereby corrected as shown below:

Column 4, line 6, "$R_1N$" should read --$R_1H$--. Column 7, line 40, "trans-" should read -- (trans- --. Column 8, lines 1-2, "isopropylidenelin-6-(trans-1-methyl-" should read --isopropylidenelincomycin (methyl 6,8-dideoxy-3,4-0-isopropylidene-6-(trans-1-methyl- --; line 9, "etythro" should read --erythro--. Column 9, line 33, "$BR_2$" should read --$Br_2$--; line 45, "COH" should read --CHO--; line 52, "bromide" should read --bromine--; line 72, "Ryon" should read --Rydon--. Column 12, line 56, "dodecycloxyformic" should read --dodecyloxyformic--. Column 14, line 10, "C—NH|" should read -- C—NH— --. Column 16, line 36, "bacterial" should read --bacteria--; line 38, "$C_{20}H_{33}Cl_2N_2O_5S$" should read --$C_{20}H_{37}Cl_2N_2O_5S$--; line 52, "4-butyl-5-2-" should read -- 4-butyl-L-2- --; line 58, "cyslohexylamine" should read --cyclohexylamine--. Column 17, line 6, "oil" should be --oily--; line 15, "0.00" should read --0.99--. Column 19, line 14, "$C_4H_3$" should read --$C_4H_9$--. Column 20, line 75, "ensuing" should read --ensuring--. Column 22, line 22, "acetate, acetate, water" should read --acetate, acetone, water--; line 47, "epimer about" should read --epimer was about--. Column 23, line 2, "$H_1O$" should read --$H_2O$--; line 44, "ethylbutyl" should read --ethyl-4-butyl--. Column 24, line 54,

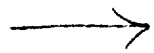

"capric" should read --caproic--. Column 25, Table, "AQ------octyly" should read --AQ------octyl--. Column 26, line 2, "HR₃" should read --HR₁--; lines 20-25, the formula should read

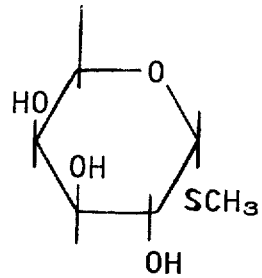

Column 27, line 11, "deoxylincomylcin" should read --deoxylincomycin--. Column 28, lines 16-17, "pyrrolidinecar oxamido" should read --pyrrolidinecarboxamido--. Column 29, line 64, "hydrochlorid" should read --hydrochloric--. Column 30, line 42, "thio-1-threo" should read --thio-L-threo--. Column 31, line 1, "Hydrogenalysis" should read --Hydrogenolysis--. Column 32, line 2, "basis if its" should read --basis of its--; line 11, "1 Cabobenzoxy-propylidene" should read --1-Carbobenzoxy-4-propylidene--. Column 35, line 15, "C₂H₇" should read --C₃H₇--. Column 36, line 32, "(1-ethyl)-" should read -- (1-ethyl- --; line 48, "obtain" should read --obtained--. Column 37, lines 50-58, the formula should read

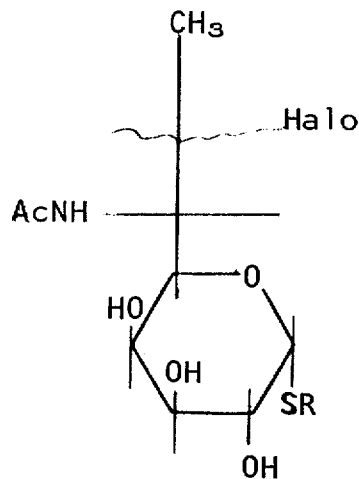

3,496,163            -3-            February 17, 1970

Column 39, line 15, "OH₃" should read --CH₃--. Column 43, line 5, "L-pyrrolidine..." should read --L-2-pyrrolidine...--

Signed and sealed this 30th day of November 1971.

(SEAL)
Attest:

EDWARD M. FLETCHER, JR.          ROBERT GOTTSCHALK
Attesting Officer                Acting Commissioner of Patents